US008037021B2

(12) United States Patent
Adler et al.

(10) Patent No.: US 8,037,021 B2
(45) Date of Patent: Oct. 11, 2011

(54) CALENDARING TECHNIQUES AND INTERFACES

(75) Inventors: Scott Joseph Adler, Menlo Park, CA (US); Matthew Dimaggio, Sunnyvale, CA (US); Matthew Elliott Shepherd, San Francisco, CA (US); Lala Dutta, Cupertino, CA (US); Bruce Arthur, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 441 days.

(21) Appl. No.: 11/975,162

(22) Filed: Oct. 17, 2007

(65) Prior Publication Data
US 2008/0306963 A1 Dec. 11, 2008

Related U.S. Application Data

(60) Provisional application No. 60/943,057, filed on Jun. 10, 2007.

(51) Int. Cl.
*G06F 7/00* (2006.01)
*G06F 17/00* (2006.01)

(52) U.S. Cl. ........ 707/610; 707/736; 707/758; 707/951; 709/206; 715/963

(58) Field of Classification Search ............. 707/1, 101, 707/100, 200, 999.107, 999.204, 999.101, 707/999.003, 610, 721, 736, 758, 951; 715/764, 715/866, 963; 705/26, 8, 14.57, 9; 709/226, 709/206, 203, 201
See application file for complete search history.

(56) References Cited

U.S. PATENT DOCUMENTS

| | | | |
|---|---|---|---|
| 5,301,270 A * | 4/1994 | Steinberg et al. | 715/866 |
| 5,625,377 A | 4/1997 | Jenson | |
| 5,787,448 A | 7/1998 | Anderson et al. | |
| 6,023,722 A * | 2/2000 | Colyer | 709/201 |
| 6,026,410 A | 2/2000 | Allen et al. | |
| 6,029,171 A | 2/2000 | Smiga et al. | |
| 6,421,678 B2 | 7/2002 | Smiga et al. | |
| 6,622,147 B1 | 9/2003 | Smiga et al. | |
| 6,978,246 B1 * | 12/2005 | Ruvolo et al. | 705/8 |
| 7,146,381 B1 | 12/2006 | Allen et al. | |
| 7,333,976 B1 * | 2/2008 | Auerbach et al. | 1/1 |
| 7,440,961 B1 * | 10/2008 | Matousek | 707/101 |
| 7,499,958 B1 * | 3/2009 | Ionescu | 1/1 |
| 7,802,206 B1 * | 9/2010 | Davis et al. | 715/864 |
| 2002/0091697 A1 | 7/2002 | Huang et al. | |
| 2003/0018651 A1 | 1/2003 | Funaki | |
| 2003/0041179 A1 * | 2/2003 | Snead et al. | 709/321 |
| 2003/0055829 A1 * | 3/2003 | Kambo et al. | 707/100 |

(Continued)

OTHER PUBLICATIONS

Anagram, Quickstart, Nov. 26, 2007, 21 pages http://getanagram.com/anagram/download.html.

(Continued)

*Primary Examiner* — Giovanna Colan
(74) *Attorney, Agent, or Firm* — Blakely, Sokoloff, Taylor & Zafman LLP

(57) ABSTRACT

The calendaring techniques and interfaces described herein provide access to calendar data stored in a server hosted calendar store to applications. The calendar data includes calendar events and tasks. In one aspect, an application program interface (API) retrieves an occurrence from a series of reoccurring calendar data upon request from an application. In another aspect, the API sends calendar data provided by the application to a server program that manages a calendar store for storage and queries the server program to retrieve calendar data requested by the application from the calendar store. In yet another aspect, the API sends notifications that the calendar store has changed to interested applications.

20 Claims, 32 Drawing Sheets

U.S. PATENT DOCUMENTS

| | | | |
|---|---|---|---|
| 2003/0097361 A1 | 5/2003 | Huang et al. | |
| 2003/0135559 A1 | 7/2003 | Bellotti et al. | |
| 2003/0135659 A1 | 7/2003 | Bellotti et al. | |
| 2004/0017400 A1 | 1/2004 | Ly et al. | |
| 2004/0044646 A1* | 3/2004 | Hullot et al. | 707/1 |
| 2004/0158637 A1* | 8/2004 | Lee | 709/226 |
| 2004/0196313 A1 | 10/2004 | Wynn et al. | |
| 2004/0243677 A1 | 12/2004 | Curbow et al. | |
| 2005/0015441 A1* | 1/2005 | Attwood et al. | 709/203 |
| 2005/0050146 A1 | 3/2005 | Jani et al. | |
| 2005/0071740 A1 | 3/2005 | Chee et al. | |
| 2005/0120108 A1* | 6/2005 | Wisniewski et al. | 709/224 |
| 2005/0192857 A1* | 9/2005 | Levine | 705/8 |
| 2005/0222891 A1* | 10/2005 | Chan et al. | 705/9 |
| 2005/0251826 A1* | 11/2005 | Orr | 725/46 |
| 2006/0020889 A1* | 1/2006 | Coppinger et al. | 715/710 |
| 2006/0095859 A1* | 5/2006 | Bocking et al. | 715/764 |
| 2006/0143613 A1* | 6/2006 | Lippe et al. | 718/100 |
| 2006/0190313 A1 | 8/2006 | Lu | |
| 2006/0265396 A1* | 11/2006 | Raman et al. | 707/10 |
| 2007/0016646 A1* | 1/2007 | Tendjoukian et al. | 709/206 |
| 2007/0021137 A1* | 1/2007 | Kokkonen et al. | 455/518 |
| 2007/0038711 A1 | 2/2007 | MacBeth et al. | |
| 2007/0130369 A1 | 6/2007 | Nayak | |
| 2007/0150513 A1* | 6/2007 | Vanden Heuvel et al. | 707/104.1 |
| 2007/0186214 A1 | 8/2007 | Morgan | |
| 2007/0239559 A1* | 10/2007 | Alperin et al. | 705/26 |
| 2007/0239831 A1* | 10/2007 | Basu | 709/206 |
| 2007/0239832 A1* | 10/2007 | Alperin et al. | 709/206 |
| 2007/0280459 A1* | 12/2007 | Yee et al. | 379/201.01 |
| 2008/0022379 A1* | 1/2008 | Wray | 726/6 |
| 2008/0033950 A1 | 2/2008 | Lemay et al. | |
| 2008/0034315 A1 | 2/2008 | Langoulant et al. | |
| 2008/0046311 A1* | 2/2008 | Shahine et al. | 705/14 |
| 2008/0104052 A1 | 5/2008 | Ryan et al. | |
| 2008/0162614 A1 | 7/2008 | Hurmola et al. | |
| 2008/0195455 A1* | 8/2008 | May et al. | 705/9 |
| 2008/0307007 A1* | 12/2008 | Alom et al. | 707/200 |

OTHER PUBLICATIONS

Anagram, Setting Preferences, Nov. 16, 2007, 20 pages http://getanagram/anagram/download.html.

Bellotti, Victoria et al. "Taking Email to Task: The Design and Evaluation of a Task Management Centered Email Tool," CHI 2003, Ft. Lauderdale, Florida, Apr. 5-10, 2003, vol. 5, Issue 1, Paper: "Integrating Tools and Tasks," pp. 345-352.

Cardoza, Patricia. Special Edition Using Microsoft Office Outlook 2003, published Sep. 25, 2003, pp. 1-67.

copy2calendar, Nov. 26, 2007, 7 pages http://www.loquisoft.com/copy2calendar setup.exe.

Lawrence, Sandy. "Drag and Drop for Time Management", Jul. 29, 2003, pp. 1-4.

Microsoft Outlook 2003, screenshot from working application, Figure 1.

Microsoft Outlook 2003 SP2; screen captures from MS Outlook 2003 SP2; pp. 1-7; released Sep. 2005.

Nayak, Vasant. U.S. Appl. No. 60/597,500 titled "Email and Task-Managing Software," filed Dec. 6, 2005, 9 pages.

* cited by examiner

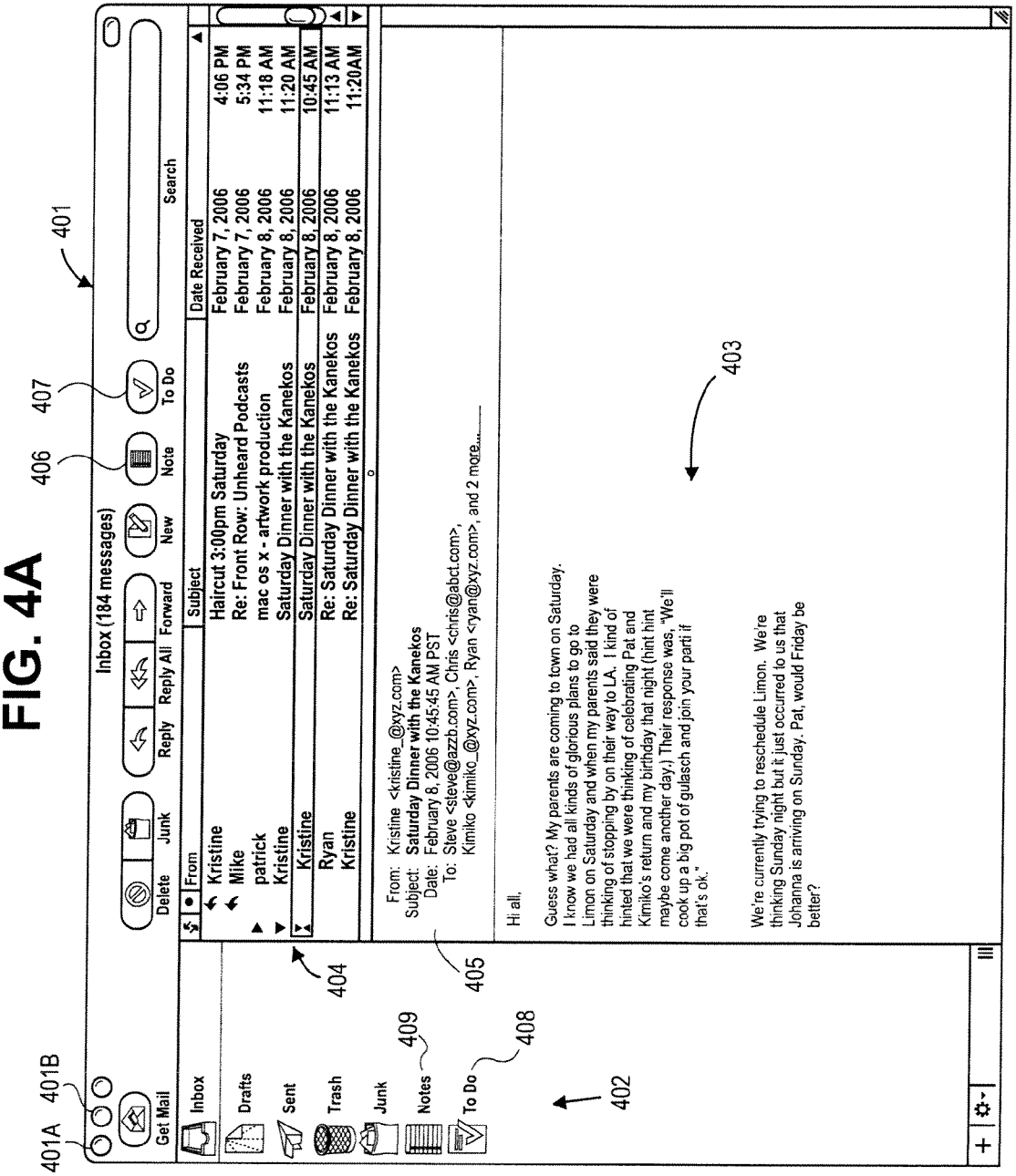

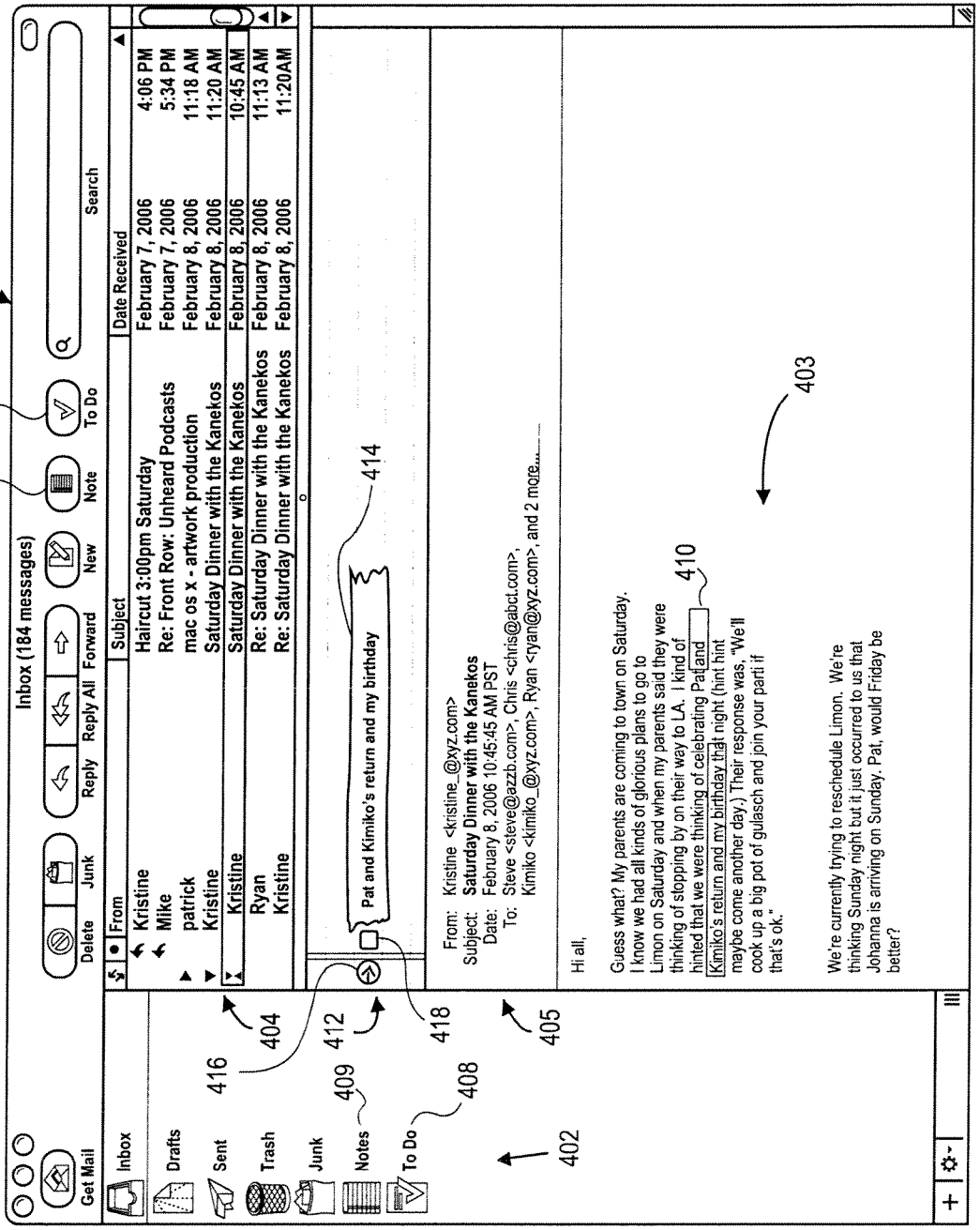

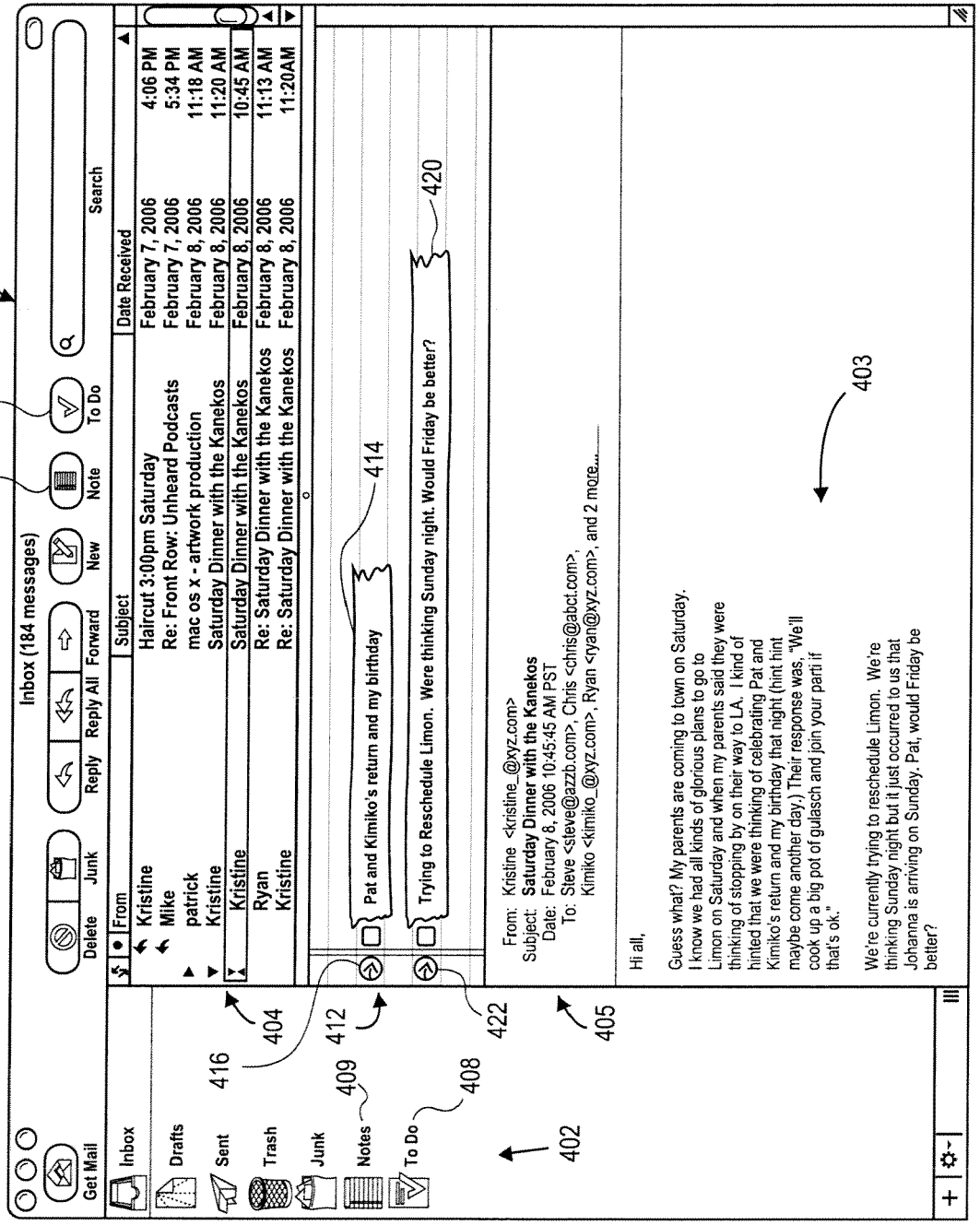

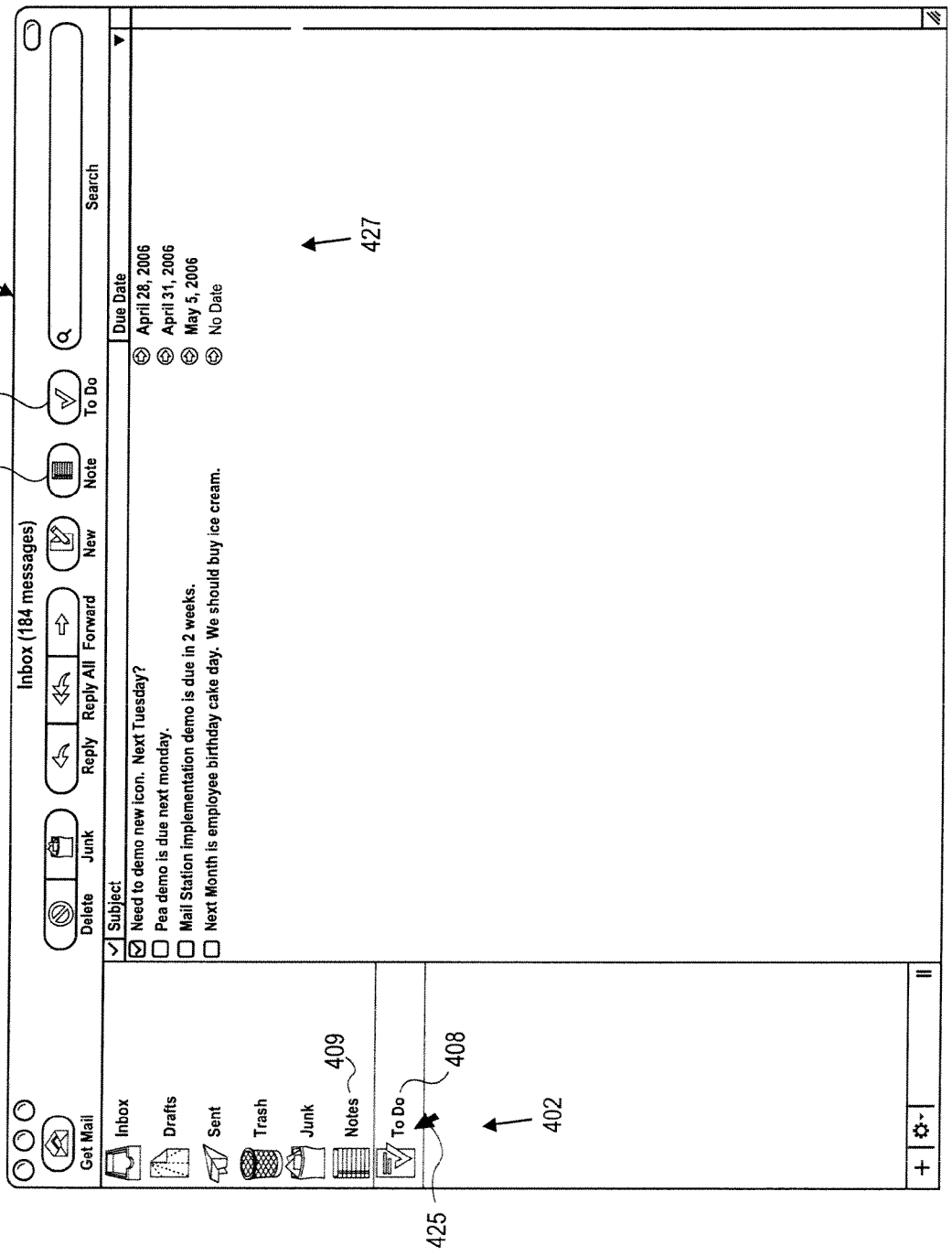

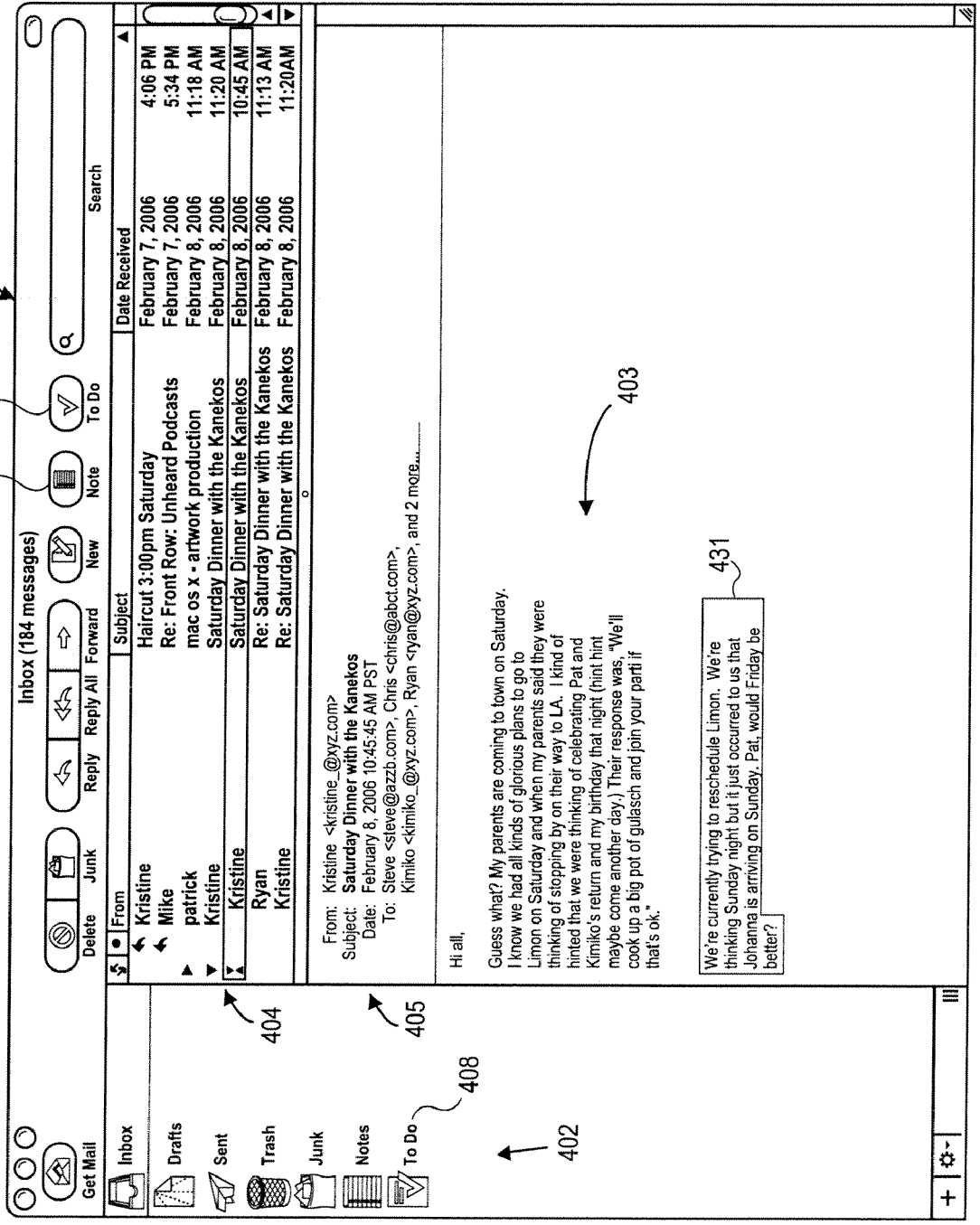

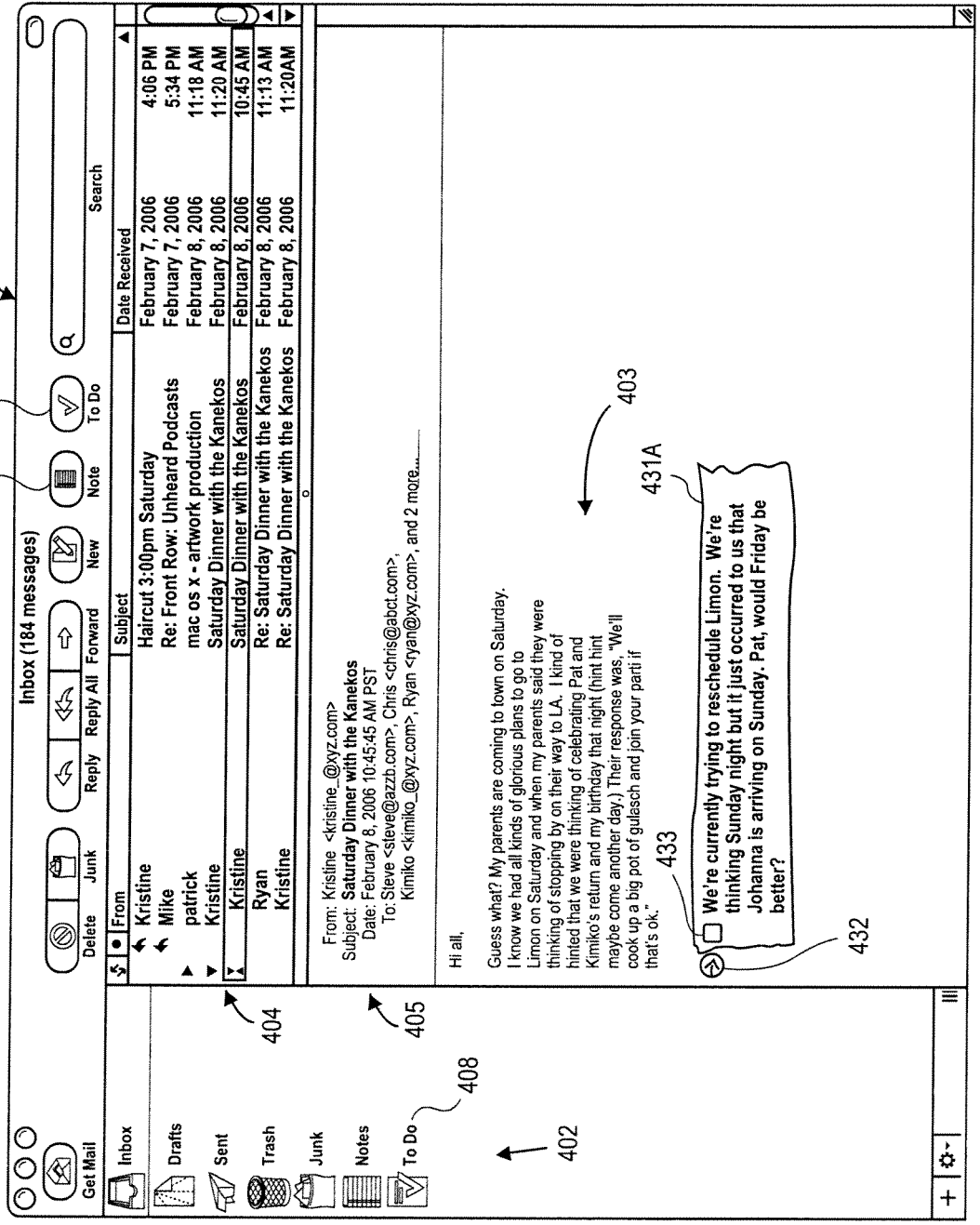

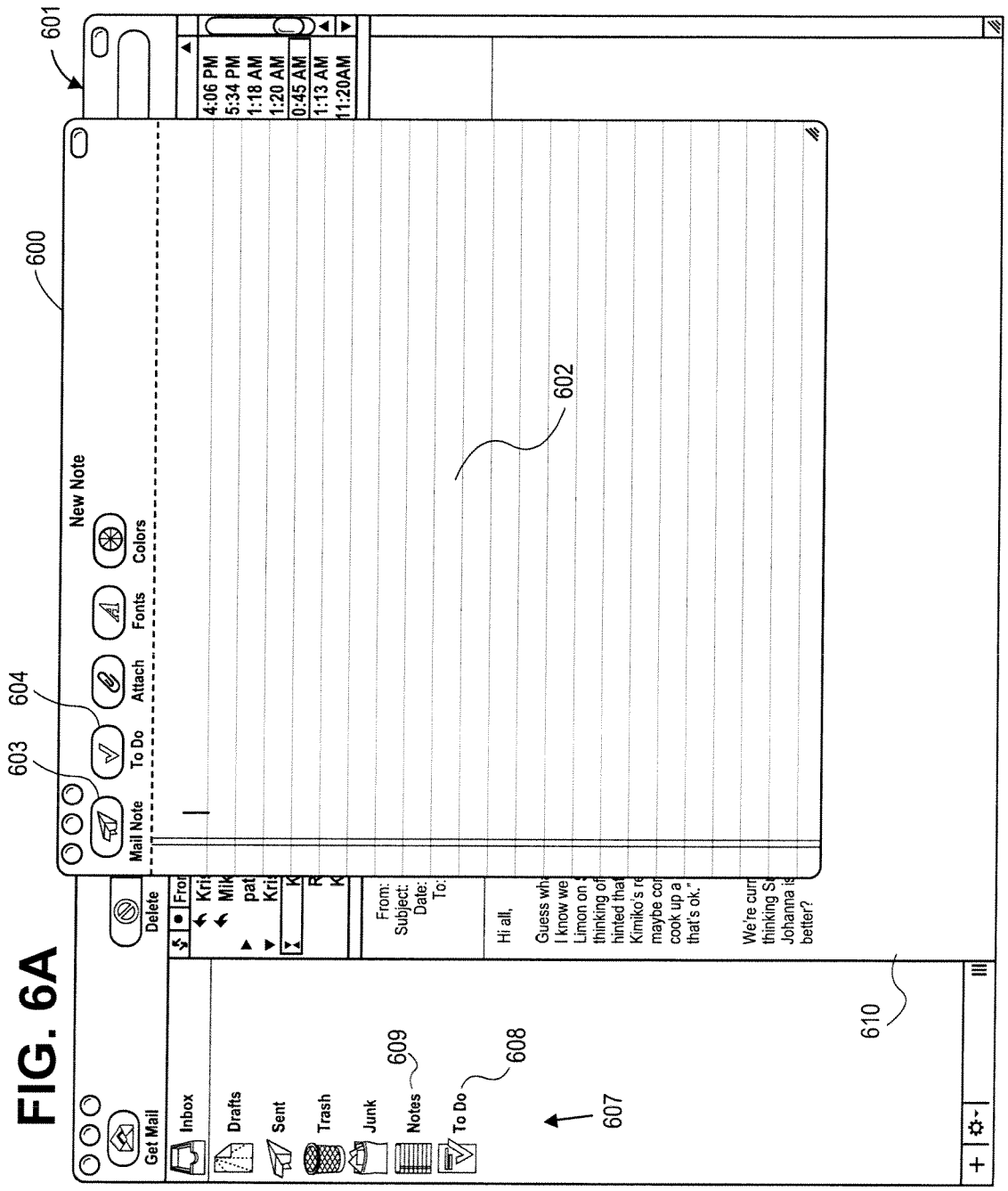

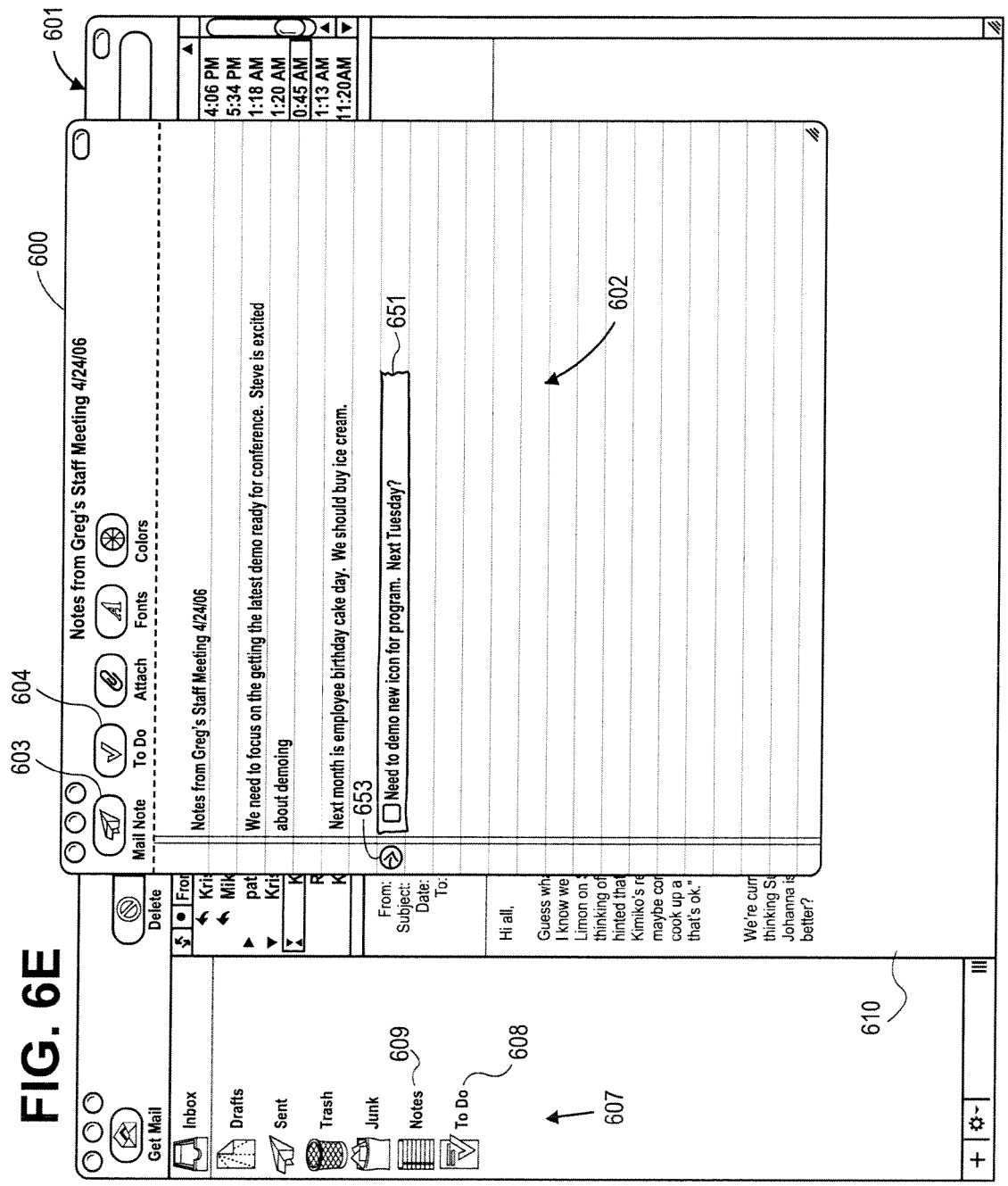

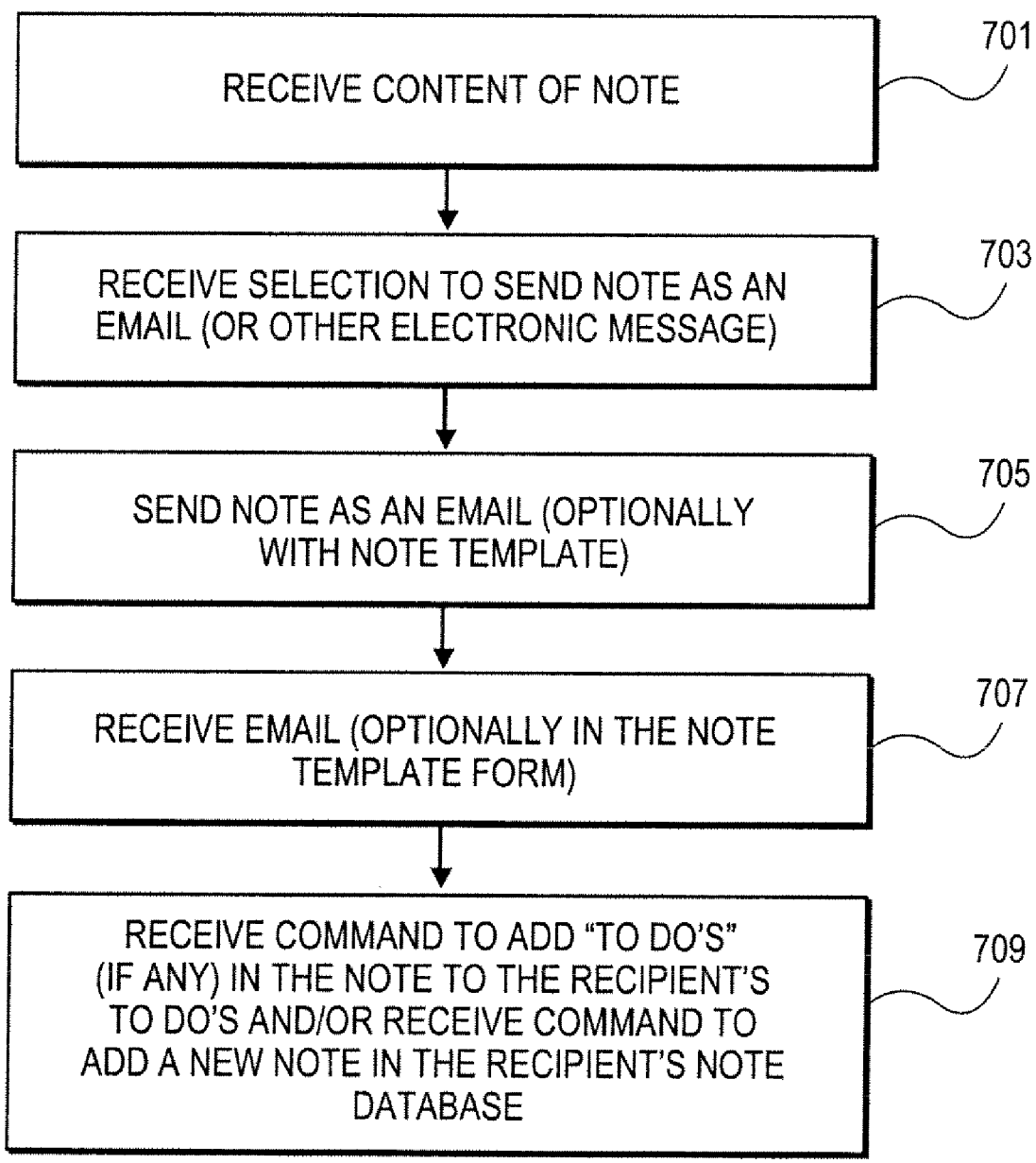

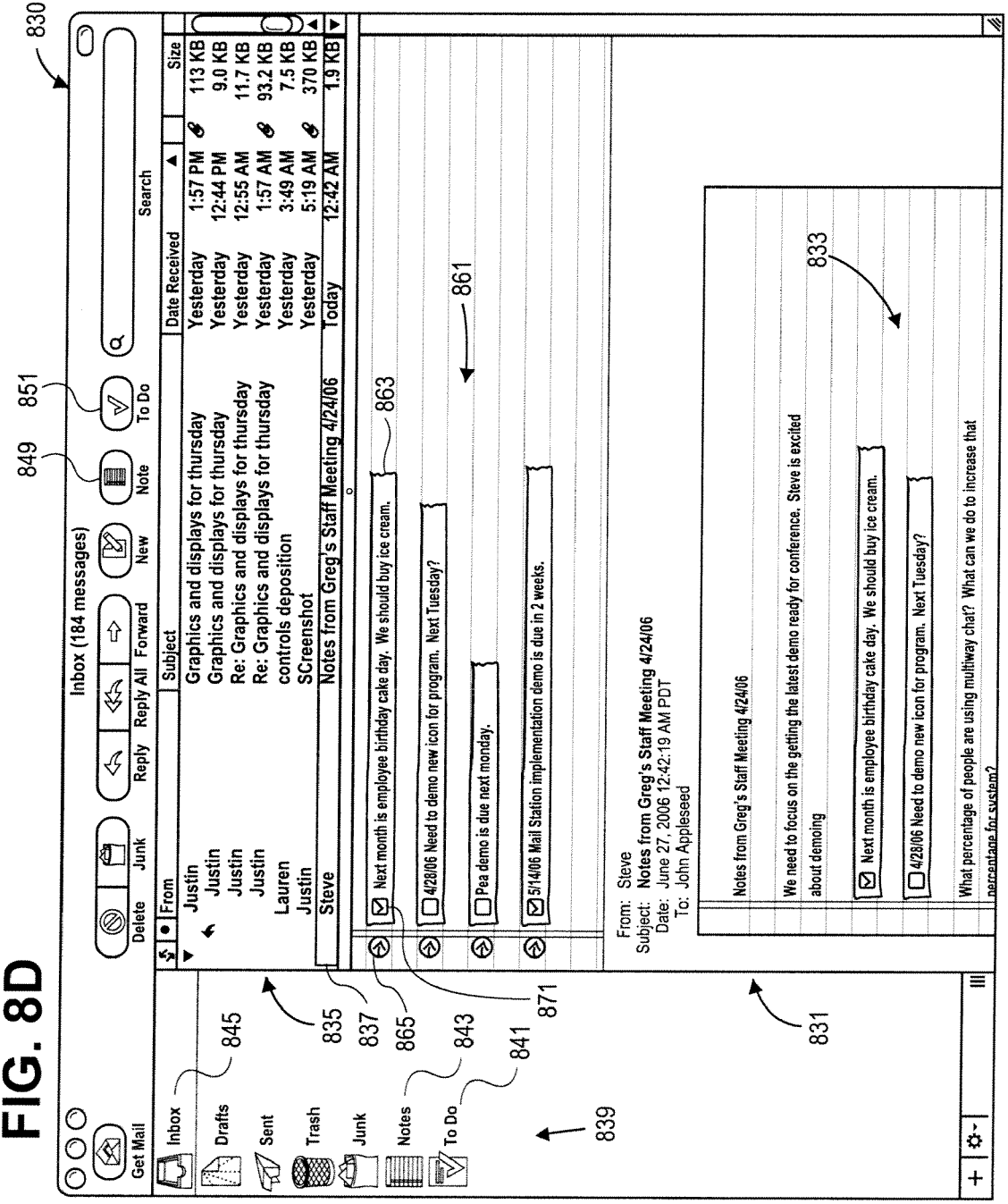

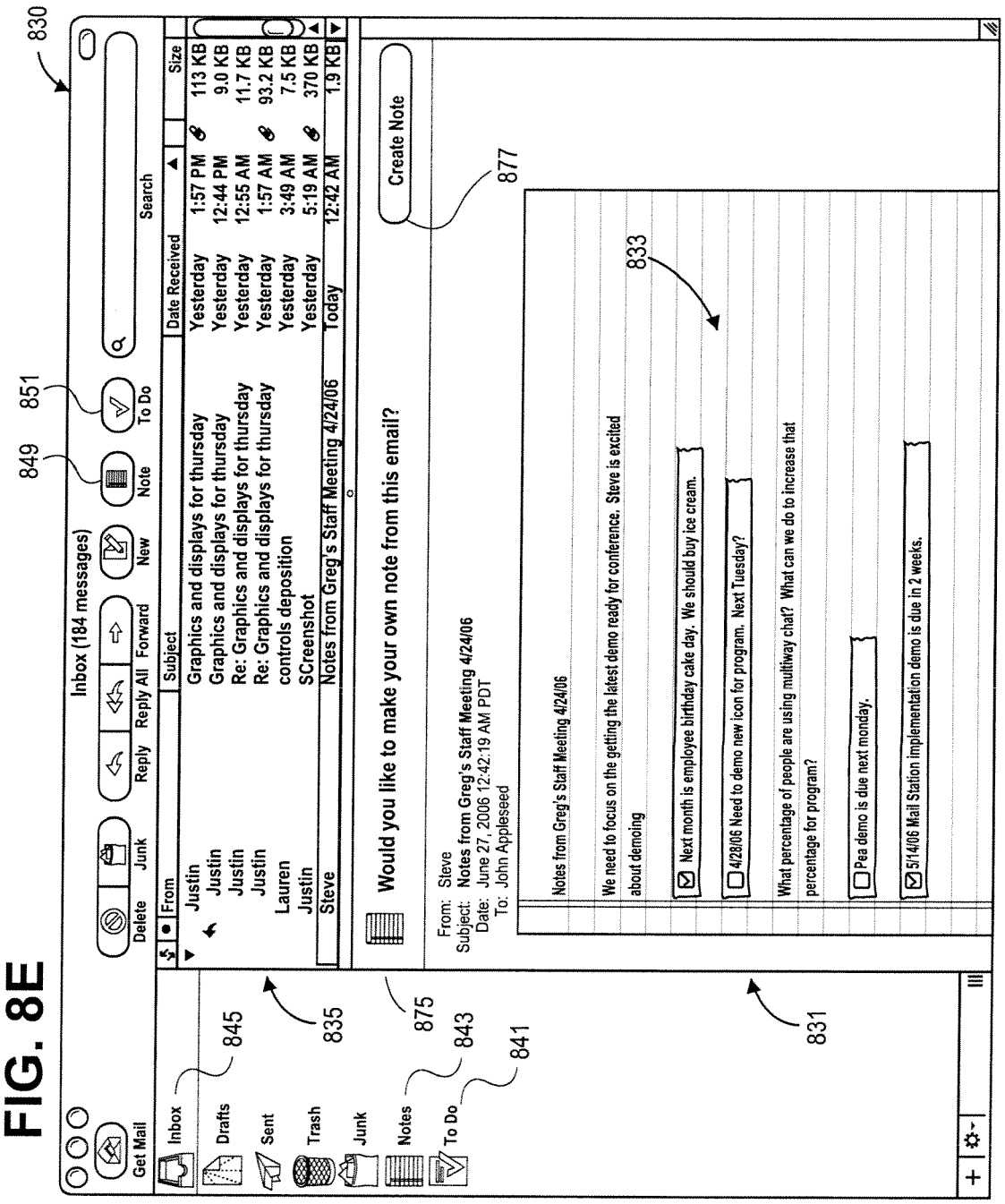

US 8,037,021 B2

CALENDARING TECHNIQUES AND INTERFACES

RELATED APPLICATIONS

This application claims priority to U.S. Provisional Patent Application No. 60/943,057, filed on Jun. 10, 2007, which is hereby incorporated by reference.

BACKGROUND OF THE INVENTION

The present inventions relate to interfacing applications to a calendar data store.

Modern data processing systems, such as a general purpose computer, a handheld computer, a cellular telephone, media players, etc. are typically used for a variety of purposes, including uses relating to maintaining lists of items to do or maintaining notes or information for the user and/or allowing the user to transmit electronic messages, such as email, to other users, often through a network. Certain data processing systems utilize one application program to provide email facilities and another application program to provide a calendar facility. An example of such a data processing system is the Macintosh computer from Apple Inc. of Cupertino, Calif. An email program known as "Mail" provides email functionality while a separate application program known as iCal provides calendaring functions. There are also examples of an application program which provides a combination of such facilities, such as the program Entourage from Microsoft Corporation, which program runs on a Macintosh computer. The program Entourage includes email functionality as well as a notes functionality, a calendar functionality and a task or To do functionality.

Because each application is designed to access a particular type of data and each type of data is typically stored in a different data store, it is difficult for one application to access a different data store. Moreover, one application may need to be aware of data changes made by a different application.

SUMMARY OF THE DESCRIPTION

The calendaring techniques and interfaces described herein provide access to calendar data stored in a server hosted calendar store to applications. The calendar data includes calendar events and tasks. In one aspect, an application program interface (API) retrieves an occurrence from a series of reoccurring calendar data upon request from an application. In another aspect, the API sends calendar data provided by the application to a server program that manages a calendar store for storage and queries the server program to retrieve calendar data requested by the application from the calendar store. In yet another aspect, the API sends notifications that the calendar store has changed to interested applications.

Certain implementations include the use of an IMAP server to synchronize data in the calendar store. To do information or metadata may be encoded and stored as an email message on an IMAP server in certain embodiments. Certain embodiments may allow synchronization between multiple machines using multiple transport protocols, and other servers, such as a CalDAV server, may be used.

One or more methods described herein by be performed by a data processing system, such as a general purpose computer system, a PDA, a cellular telephone, a media player, etc. These devices may use one or more computer programs to perform these methods and they may include machine readable media containing those computer programs.

The methods and/or computer programs of any one of these embodiments may be compliant with standards for calendaring applications, such as iCal and vCal, and may allow for the importation of data from other applications such as Entourage, or other calendaring programs.

In addition, in at least certain embodiments, the methods or systems described herein may enable copy and paste operations with other applications, and may enable drag and drop manipulations or the use of a spell checker, or the integration with email applications and address book applications for management of personal information. Furthermore, in at least certain embodiments, the methods and systems described herein may also permit users to publish their calendars to others (e.g. publish their calendar through the use of the Internet) and may also allow a user to subscribe to other calendars, thereby coordinating or managing events of one user with those of another.

BRIEF DESCRIPTION OF THE DRAWINGS

The present invention is illustrated by way of example and not limitation in the figures of the accompanying drawings in which like references indicate similar elements.

FIGS. 4A, 4B, 4C, and 4D show an exemplary user interface which may be used to create a To do from an email, such as a received email.

FIG. 4E shows an exemplary user interface for displaying a list of To do items within a To do database for a user.

FIGS. 4F and 4G show an exemplary user interface in an alternative embodiment for allowing a user to create To do's from an email, such as a received email.

FIGS. 6A, 6B, 6C, 6D, 6E, 6F, and 6G illustrate examples of user interfaces which may be used by a user to create one or more To do items from a note document or form.

FIG. 7 is a flowchart illustrating an exemplary method according to certain aspects of the present inventions.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2006.

Figure 1:
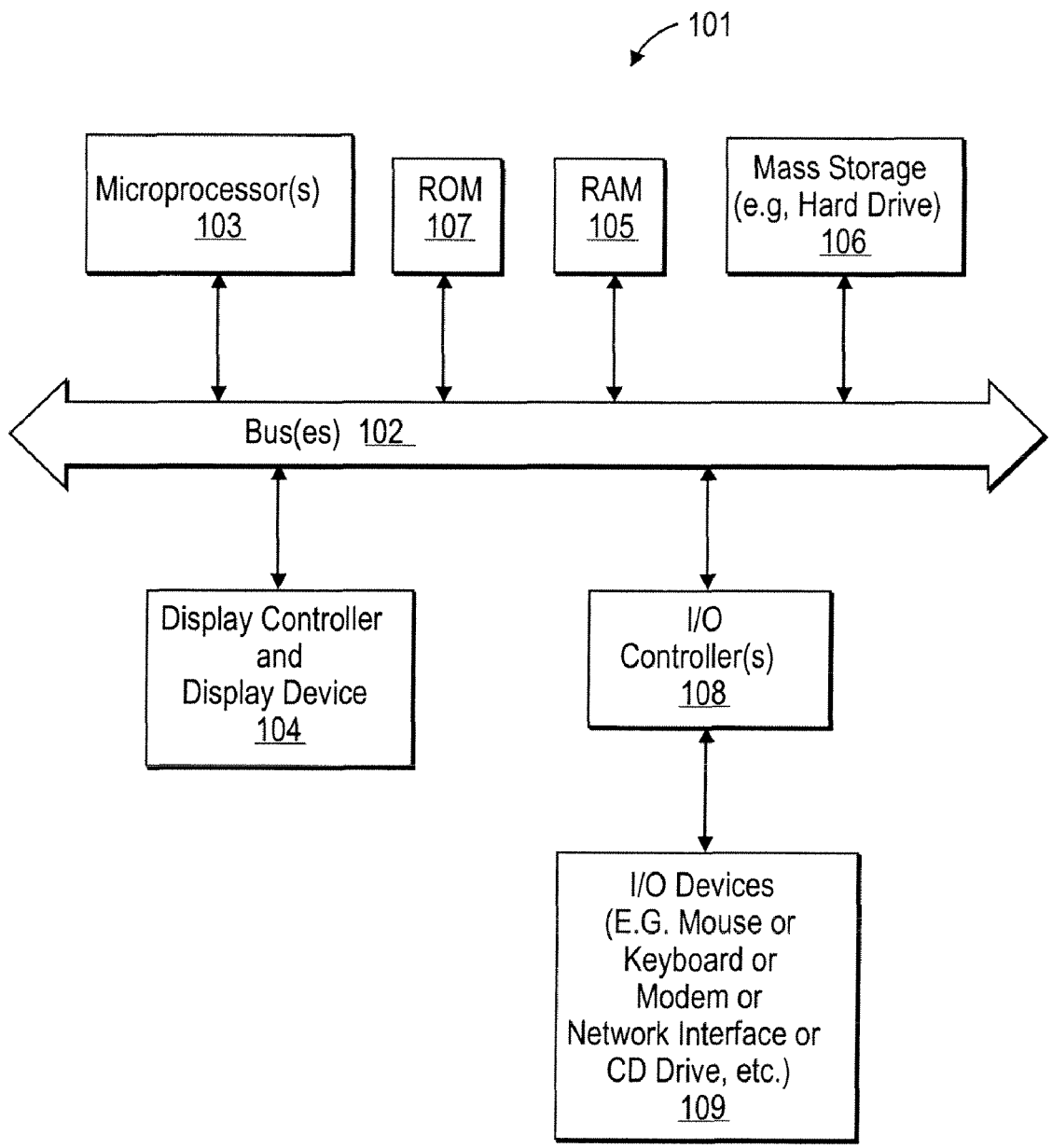
FIG. 1 shows an exemplary embodiment of a data processing system which may be a general purpose computer system or other types of data processing systems and which may operate in any one of the various methods described herein.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that personal digital assistants (PDAs), cellular telephones, media players (e.g. an iPod), devices which combine aspects or functions of these devices (e.g. a media player combined with a PDA and a cellular telephone in one device), network computers, an embedded processing device within another device, and other data processing systems which have fewer components or perhaps more components may also be used to implement one or more embodiments of the present inventions. The computer system of FIG. 1 may, for example, be a Macintosh computer from Apple Computer, Inc.

As shown in FIG. 1, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be a microprocessor or set of microprocessors from Intel or a G3 or G4 microprocessor from Motorola, Inc. or one or more G5 microprocessors from IBM. The bus 102 interconnects these various components together and also interconnects these components 103, 107, 105, and 106 to a display controller and display device 104 and to peripheral devices such as input/output (I/O) devices which may be mice, keyboards, modems, network interfaces, printers and other devices which are well known in the art. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or other types of memory systems which maintain data (e.g. large amounts of data) even after power is removed from the system. Typically, the mass storage 106 will also be a random access memory although this is not required. While FIG. 1 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, RAM 105, mass storage 106 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Figure 2:
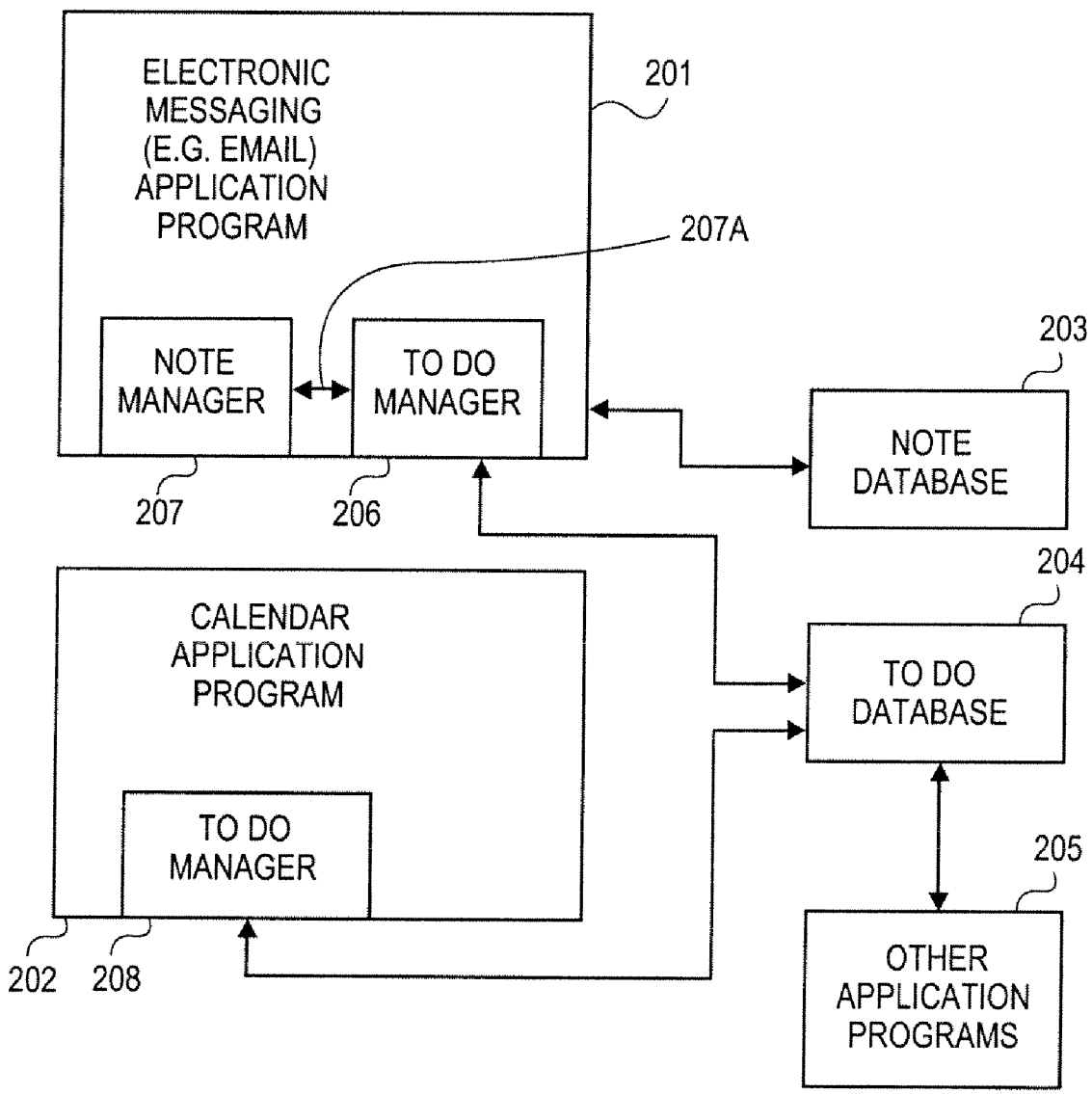
FIG. 2 shows an example of a software architecture having a system wide To do database and a note database which interact with an electronic messaging application program and a calendar application program; in alternative embodiments, the electronic messaging application program and the calendar application program may be integrated together in one application program.

FIG. 2 illustrates an exemplary software architecture and data structure which may be used with at least certain embodiments described herein. In alternative embodiments, one or more of the components may be combined together to form an integrated system. In the example shown in FIG. 2, an electronic messaging application program 201 includes a note manager 207 and a To do manager 206, each of which assist the electronic messaging application program 201 to interface with a note database and a To do database, respectively. In particular, the To do manager 206 interfaces with the To do database 204 and the note manager 207 interfaces with the note database 203. The electronic messaging application program may be a typical email program which allows a user to receive and send and create emails. The To do manager 206 allows a user to view a list or other form of To do items and to also create and edit To do items. The note manager 207 allows a user to view and create and edit notes. Further, it allows a user to convert a note into an email and to also convert a received email which has a note back into a note for storage as a note within the note database. As described below, the email application program may, in at least certain embodiments, allow a user to select a portion or all of the content of an email and then to convert that portion into a To do item which is stored in the To do list all within the same email view, without having to go to a separate view, such as a To do view. The To do's are stored in the To do database 204 which is also capable of being accessed by the calendar application program 202 which also includes the To do manager 208 which also interfaces with the To do database 204. As shown in FIG. 2, other application programs 205 may also interface with the To do items in the To do database 204. For example, a project management computer program may be able to access To do items within the To do database 204, and those To do items are synchronized between both the email program and the calendar program and the project management program, such that changes to a To do item from any of those programs are reflected in the database 204 which can then reflect those changes when the To do items are viewed either the calendar or in the email application program or other programs. In certain embodiments, a user may be viewing a calendar presented by the calendar application program and then select a command to view the note for a To do (e.g. a note containing the To do), wherein the note is displayed by the email application program. The note database, while not shown being interfaced with other application programs, may similarly be interfaced with other application programs, including the calendar application program 202 and potentially other application programs 205 in at least certain embodiments.

The architecture of the software or data structures shown in FIG. 2 allows the To do's within a note and To do items in the To do database to be actively synchronized or linked live such that a change to the To do item in the note will get reflected to the same To do item in the To do database, and vice versa. This is shown by the link 207A which links the To do manager 206 with the note manager 207. Each To do item may include an identification number which is used by both managers to reference the corresponding To do items in both the note database 203 and the To do database 204. This, in at least certain implementations, allows the To do items to be synchronized in a live manner such that a change being entered in an editable text document, such as a note, will be reflected in the corresponding text of the To do in the corresponding To do item. Similarly, when a user edits a To do item in the To do database, the To do manager can notify the note manager through link 207A that a particular To do item has been modified and the note manager will, in turn, modify the content of the corresponding note containing that To do item. In certain embodiments, with this architecture, a To do can point to the originally selected text of the message (e.g. the incoming email), and a note can point to the original message, and an email message can point to the note associated with the message.

In an alternative software architecture, the email program and the calendar application program, along with their managers, may be integrated together in a single application program. Further, in a yet another alternative embodiment, the databases may be combined together.

Figure 3:
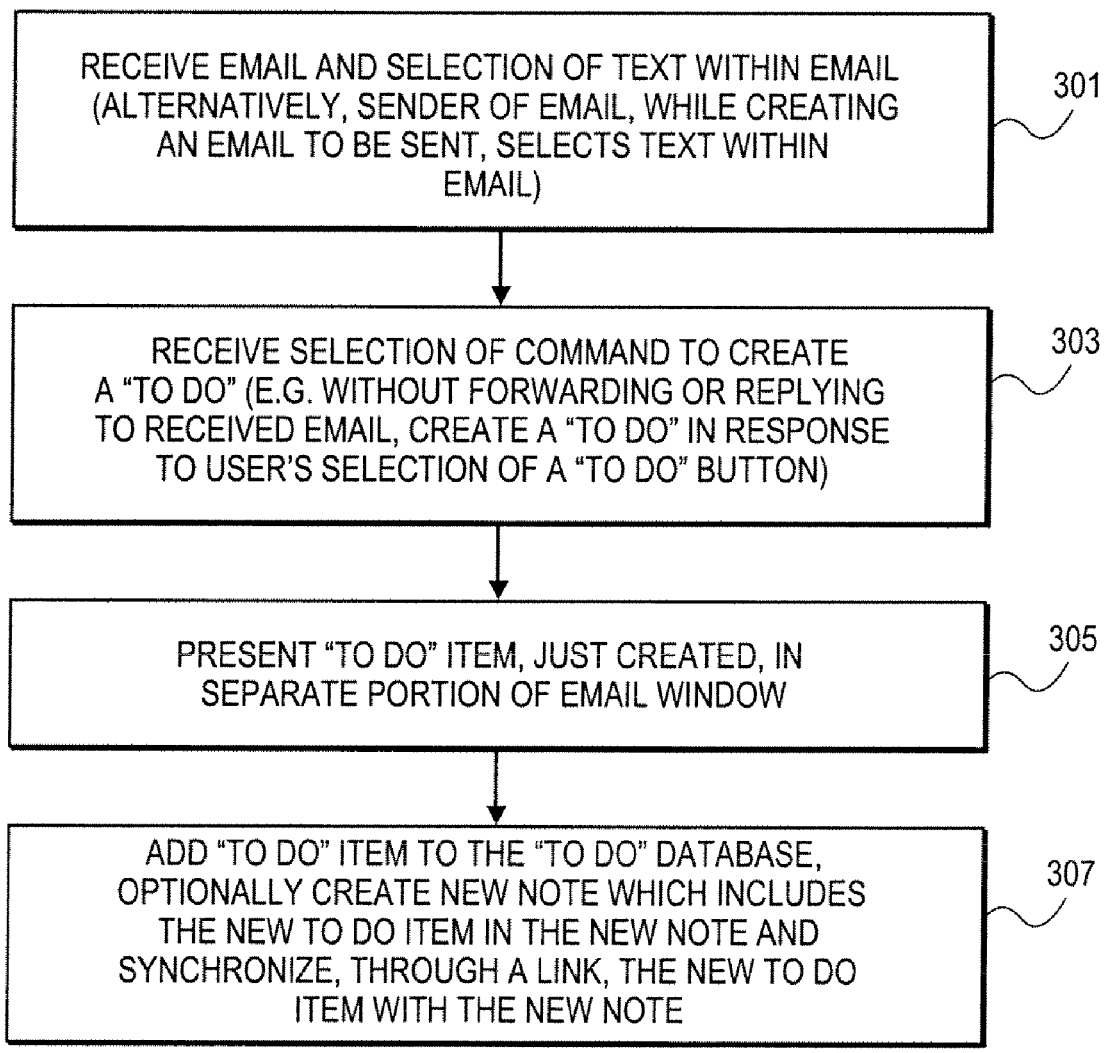
FIG. 3 is an exemplary method according to certain aspects of the present invention.
Figure 4B:
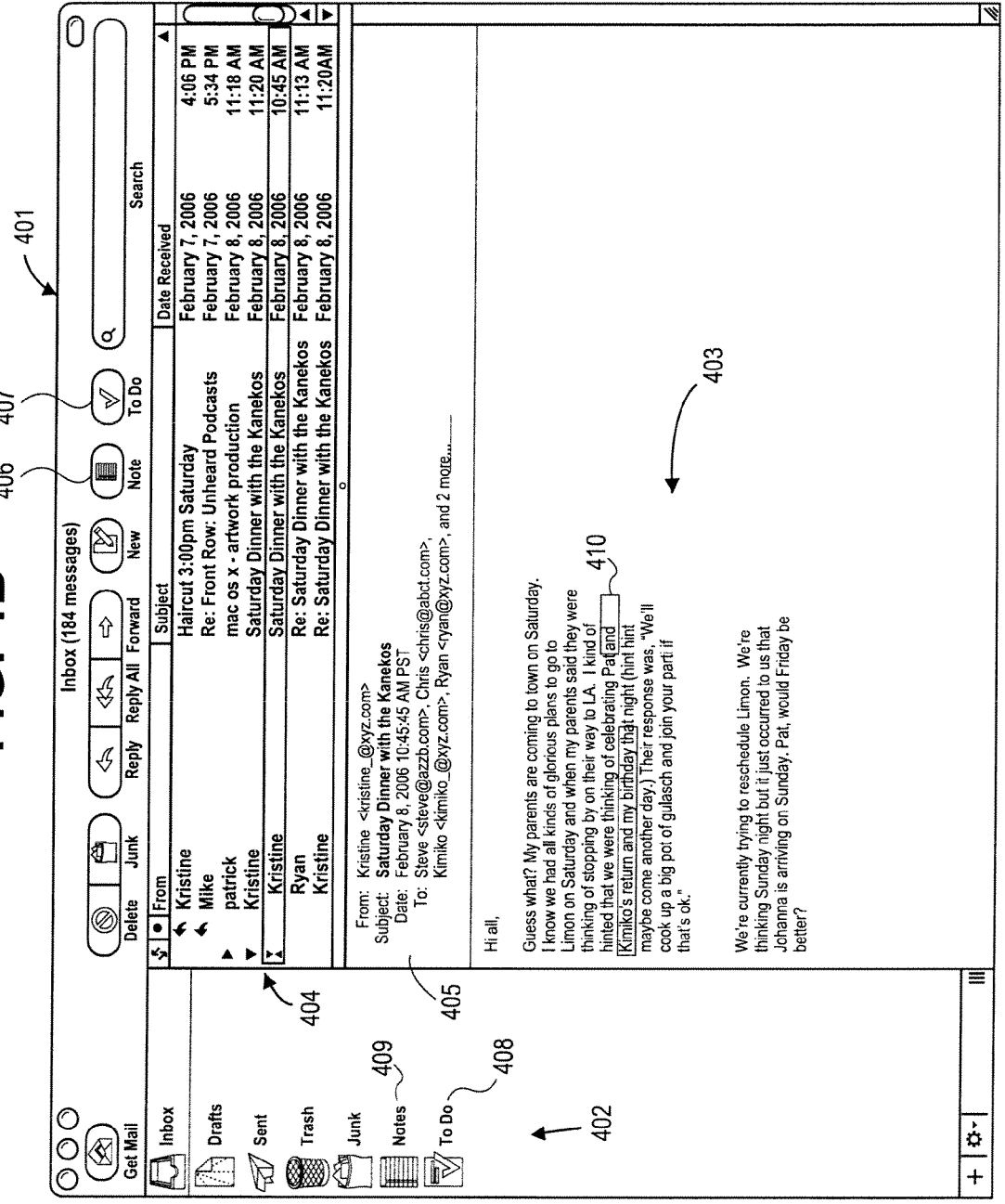

FIG. 3 shows an exemplary method for creating To do items from an email, such as a received email. This method may be employed with the exemplary user interface shown in FIGS. 4A, 4B, 4C, and 4D. In operation 301, an email is received by the data processing system which also receives a selection of text within the email. The selection may occur by a variety of different techniques known in the art, including a technique in which a user positions a cursor at a point in the text and then presses a button and holds the button in a position while moving the cursor to drag the cursor over the text to be selected. This will produce a selection of text, such as the selection 410 shown in FIG. 4B. Rather than a received email providing the text which is selected, in an alternative embodiment, the sender of an email, while creating the content of the email to be sent, selects text within the email and uses that selection as the selection of text to create a To do in subsequent operations. In operation 303, the data processing system receives a selection of a command to create "To do" item. This may be done without forwarding or replying to the received email. This may be done merely by "clicking" on a "To do" button such as the To do button 407 shown in email window 401. In this case, the user may position a cursor, using a cursor control device such as a mouse, over the To do button and may press a button, such as the mouse's button, to select the command to create the To do. Alternative user interface techniques may be employed to create a To do as well; for example, one or a sequence or a set of keystrokes, either in sequence or concurrently, may be used to provide the command which indicates to create a To do item. In an at least certain implementations of an embodiment, the newly created To do item may be presented in a separate portion of the email window, such as the portion 412 shown in FIG. 4C. The presentation of the To do item may include the text which was selected to create the To do item as well as a To do interface input control, such as the To do interface input control 412 as shown in FIG. 4C. In operation 307, the To do item which has been created is added to a To do database which is a collection of To do items created and maintained by the system. In one exemplary embodiment, a note document also gets created in operation 305. This note document may, in fact, be the document being shown in the view of the To do item presented in operation 305. Thus, for example, the view shown in the screen region 412 of the email window 401 may be a note view showing a To do item on a note within the email window. The note is maintained in a note database, such as the note database 203 and the content of the To do item in the note may be synchronized with the To do item in the To do database, such as To do database 204. In a typical implementation, the note created in operation 305 is associated with a particular email from which the To do and note was created. The note can be edited to add text and other data and remain associated with the email. In this manner, the note may be used to annotate the email and can be displayed concurrently or otherwise in association with the email with which it is associated. In addition, in at least certain embodiments, a user interface feature may be selectable by a user, when displayed or otherwise presented, to cause a To do shown in a note to show the source of the To do in the associated email. For example, a button or other displayed command interface associated with a To do on a note may be activated to present the portion of the email which contains the selected text which was used to create both the note and the corresponding To do item.

FIGS. 4A, 4B, 4C, and 4D show examples of user interfaces which may be used to create a To do item and optionally a note item or document from an email, such as a received email. In alternative embodiments, the notes and/or To do item may be created from an email which is being created by the sender of an email. The email window 401 includes a mailbox view area 402 which displays a plurality of individually selectable items, including an inbox item, which is selected for display currently in the email window 401 shown in FIG. 4A, as well as a notes collection button 409 and a To do collection button 408. A view 404 of received emails is shown as a list in the view 404 within email window 401. An email header portion 405 is also shown in the email window 401. The body of an email 403 includes user selectable or system selectable text from a received email, even though the email has not bee replied to or not yet been forwarded. The selection of text is shown in FIG. 4B which shows the selection 410 which is to be used to create a new To do item. As noted above, the user may employ a variety different user interface techniques, such as dragging a cursor over the desired text to select the text. After selecting the text, the user may select the To do button 407 to thereby cause the creation of at least a To do item and optionally also a note document as reflected in FIG. 4C. As explained above, a variety of different user interface techniques may be employed to select the To do button or to otherwise select a command to cause the creation of a new To do item. In one embodiment, the user may position the cursor over the To do button 407 and then press and release a button, such as a mouse's button. It will be appreciated that in alternative embodiments, the user may first click or select the To do button 407 and then select the text and indicate the end of a selection of the text, which in turn cases the system to create a To do item and optionally also a new note document. The result of the creation of the new To do item in at least one embodiment is shown as FIG. 4C, in which the note view 412 shows the new To do item as part of a new note. The new To do item is saved, in at least one implementation, in the To do database 204 and the new note is saved in the note database 203. The To do item 414 shown in the note view 412 includes a To do interface input control 416 and a "done" check box interface 418. The To do "title" shown in the To do item 414 defaults to the originally selected text from the email, but it may be edited without disrupting the relationship or association with the original email; in one implementation, this is archived by having the note, created with the To do item, be a "container" for the To do and have the association with the email. The To do interface input control may be used to open and close a To do input panel which can receive inputs indicating information about the To do, such as due date, alarm status, priority level, and calendar name input. The "done" check box interface can receive an input indicating that the To do item is done or otherwise completed. Additional To do's may be created from the same email as shown in FIG. 4D. In one particular implementation, these additional To do items are added to the same note which was initially created with the initial To do item 414. This note, as described above, may be associated with this email and may be retained in the system even if the email is subsequently deleted. The note may, in at least certain implementations, be synchronized through a live link described herein with the corresponding To do items on the note. Hence, editing of the To do items on the note will be reflected in the corresponding To do items in the To do database, and editing of the To do items through a To do view (e.g. the view available after selecting a To do item from the list of To do items shown in FIG. 4E) will be reflected in the data for the To do items maintained in a note document which in turn is maintained in a note database, such as the note database 204. The To do item 420 shown in FIG. 4D also includes a To do interface input control 422 which may be used to enter information about the particular To do item.

A user may desire (or the system may provide) the ability to switch between the email view shown in FIG. 4D in which the body of an email is presented within an email window, or a list of emails, such as the list view 404, is presented within an email window. The user may switch to a view of To do items by selecting the To do collection button 408 which causes the system to display To do items in the window 401A shown in FIG. 4E. This window 401A shows a view of To do items in a list in the view 427. In one embodiment, the user may select the To do collection button 408 by positioning a cursor 425 over the To do collection button within the mailbox view area 402. Within this To do item view, a user may select one of the To do items and edit the To do item, and the edits made in the To do item will be reflected for that item in the To do database and those changes will also be reflected to the corresponding To do's in the notes maintained in the note database 203 in at least certain embodiments.

FIGS. 4F and 4G show an alternative user interface in which an email is used to create a new To do item. In this alternative embodiment, the text or other information is selected within an email, such as a received email. Thus, selected text 431 is shown in the body of the email 403. This selection may be performed by the user dragging a cursor over the text in manners known in the art or by use of other known user interface techniques for selecting text. The user may then select the To do button 407, thereby causing the selected text to be turned into a new To do item. In another embodiment, the sequence of operations may be reversed such that the To do button 407 is first selected and then the text is selected with an indication of the end of the selection of the text so that the system can determine what text has been selected for the new To do item. In response to creating a new To do item, a To do item 431A is displayed within the body of the email 403 as shown in FIG. 4G and a To do interface input control 432 is also displayed adjacent to the new To do item 431A within the body of the email. In addition, a "done" check box interface 433 is also displayed adjacent to the new To do item 431A. Notes and/or To do's may be, in this alternative embodiment or in other embodiments, intermixed with email messages.

Figure 5:
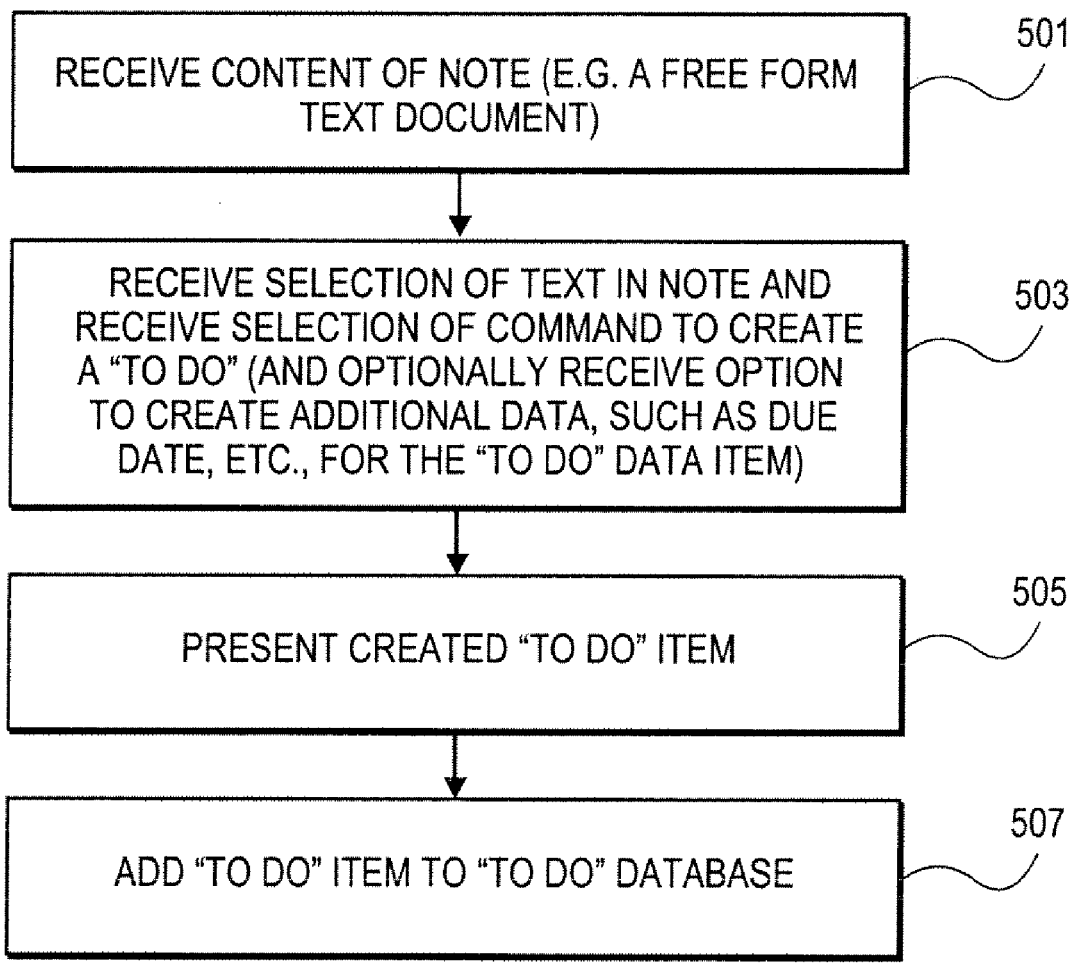
FIG. 5 is a flowchart showing an exemplary method according to certain aspects of the present invention.

FIG. 5 shows, in flowchart form, another exemplary method according to another aspect of the inventions. In this exemplary method, a note or a portion of a note is used to create a new To do item. The note may be maintained, in certain embodiments, by the note manager 207 shown in FIG. 2 and may be maintained in the note database 203 and may be synchronized with the new To do item created as part of the method of FIG. 5; this synchronization has been described elsewhere herein. The new To do item may be maintained in the To do database 204 and is similarly synchronized, in at least certain implementations, with the To do item within the note used as part of the method of FIG. 5. The method of FIG. 5 may be used with the example of a user interface shown in FIGS. 6A, 6B, 6C, 6D, 6E, 6F, and 6G. In operation 501, the content of a note, which may be a freeform text document, is received. Note window 600 shown in FIG. 6A contains a body 602 of the note which can contain the text in freeform. The note window 600 may appear as a result of a "new note" command which may arise from the activation of a note button or new note button on a user interface or by the use of one or more keystrokes or other input. In operation 503, the data processing system receives a selection of text in the note and receives a selection of a command to create a To do item. The examples of the user interface shown in FIGS. 6C and 6D provide an example of how the data processing system can receive the selection of text in a note and then receive a selection of a command to create a To do item. In an alternative embodiment, the sequence of operations may be reversed such that the data processing system first receives the selection of a command to create the To do item and then receives the beginning and end of a selection of text and, upon receiving the end of the selection of text, creates the new To do item. Optionally, operation 503 may include receiving options to create additional data, such as due date, etc. for the To do data items. A user interface for inputting or creating this additional data is shown in FIGS. 6F and 6G. After creating the new To do item, the data processing system may present the newly created To do item in operation 505 and add, in operation 507, the new To do item to the To do database, such as the To do database 204 shown in FIG. 2. In at least certain implementations, there is no need to create an additional note or new note upon creation of the To do item because the note was used to create the To do item with the To do item in the note which may be maintained, in at least certain implementations, in the note database 203 shown in FIG. 2.

Figure 6B:
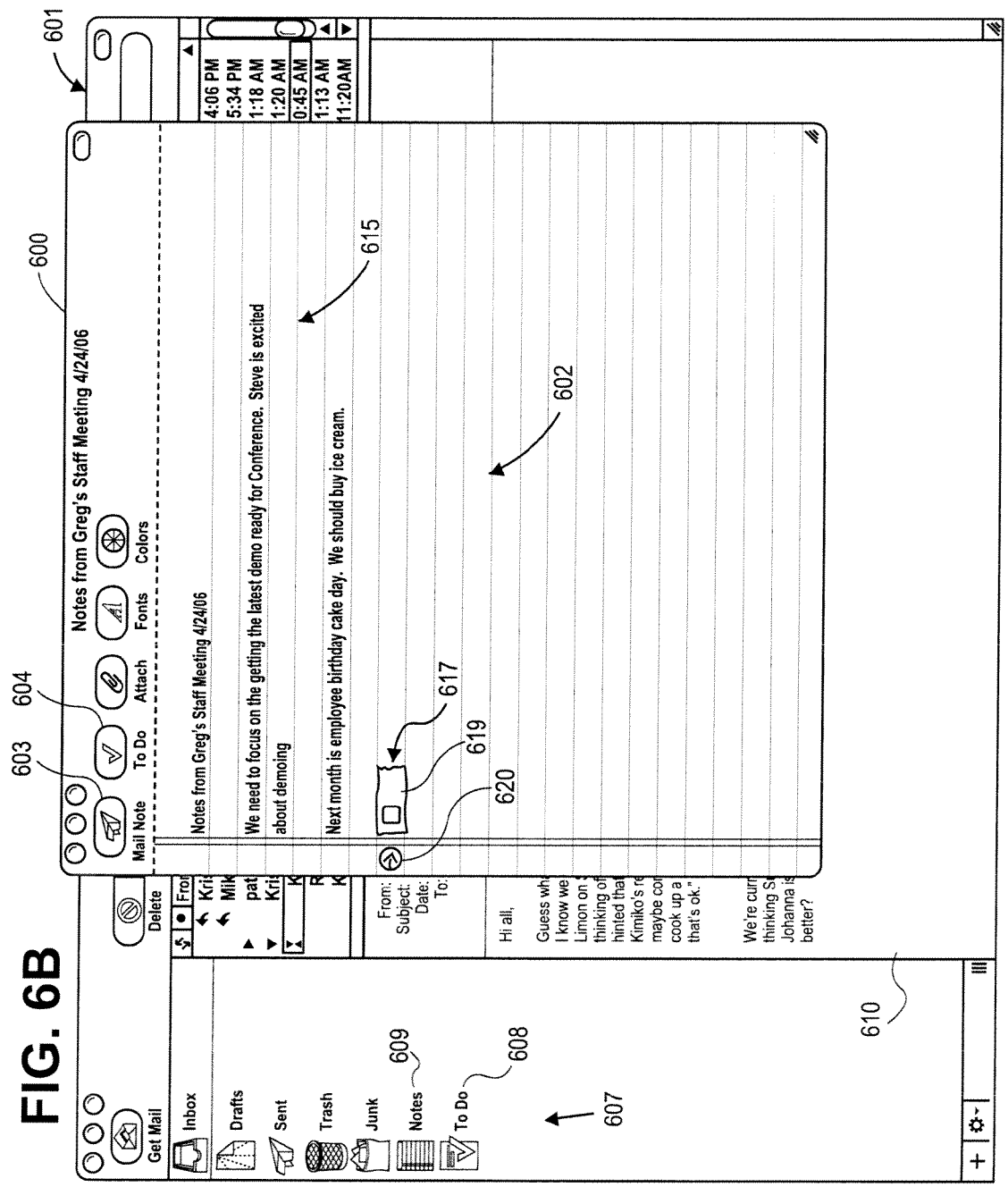
Figure 6C:
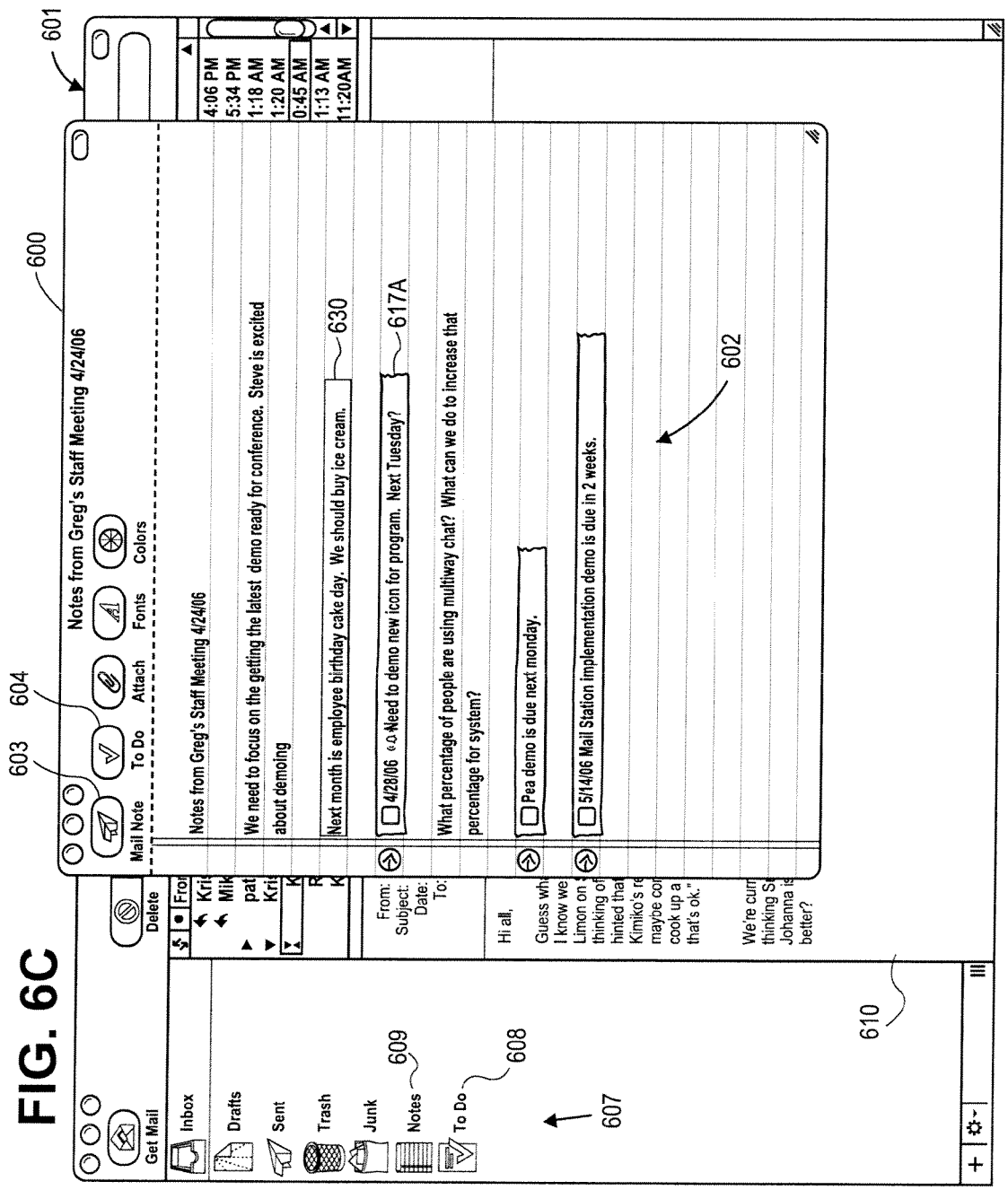
Figure 6D:
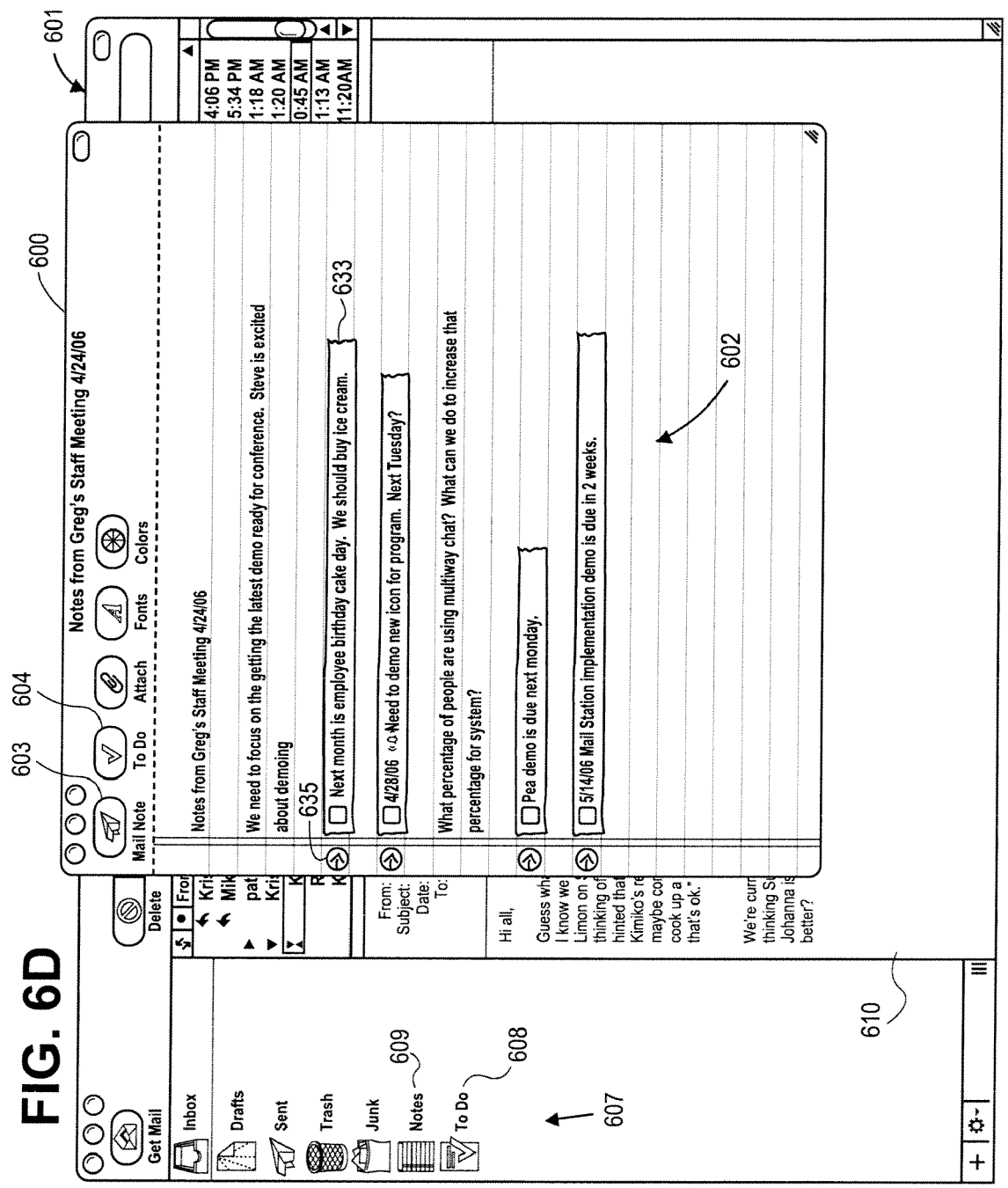
Figure 6F:
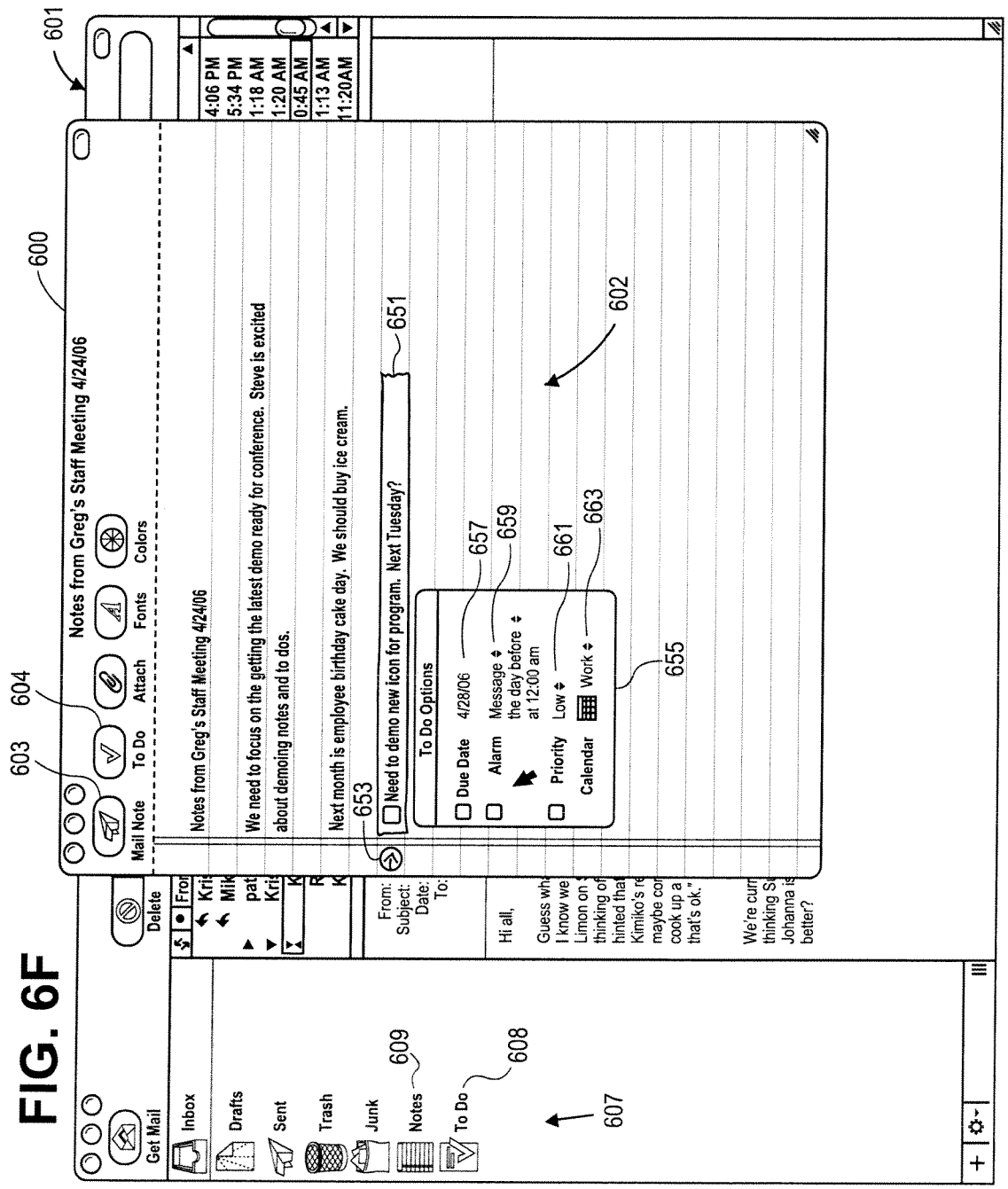
Figure 6G:
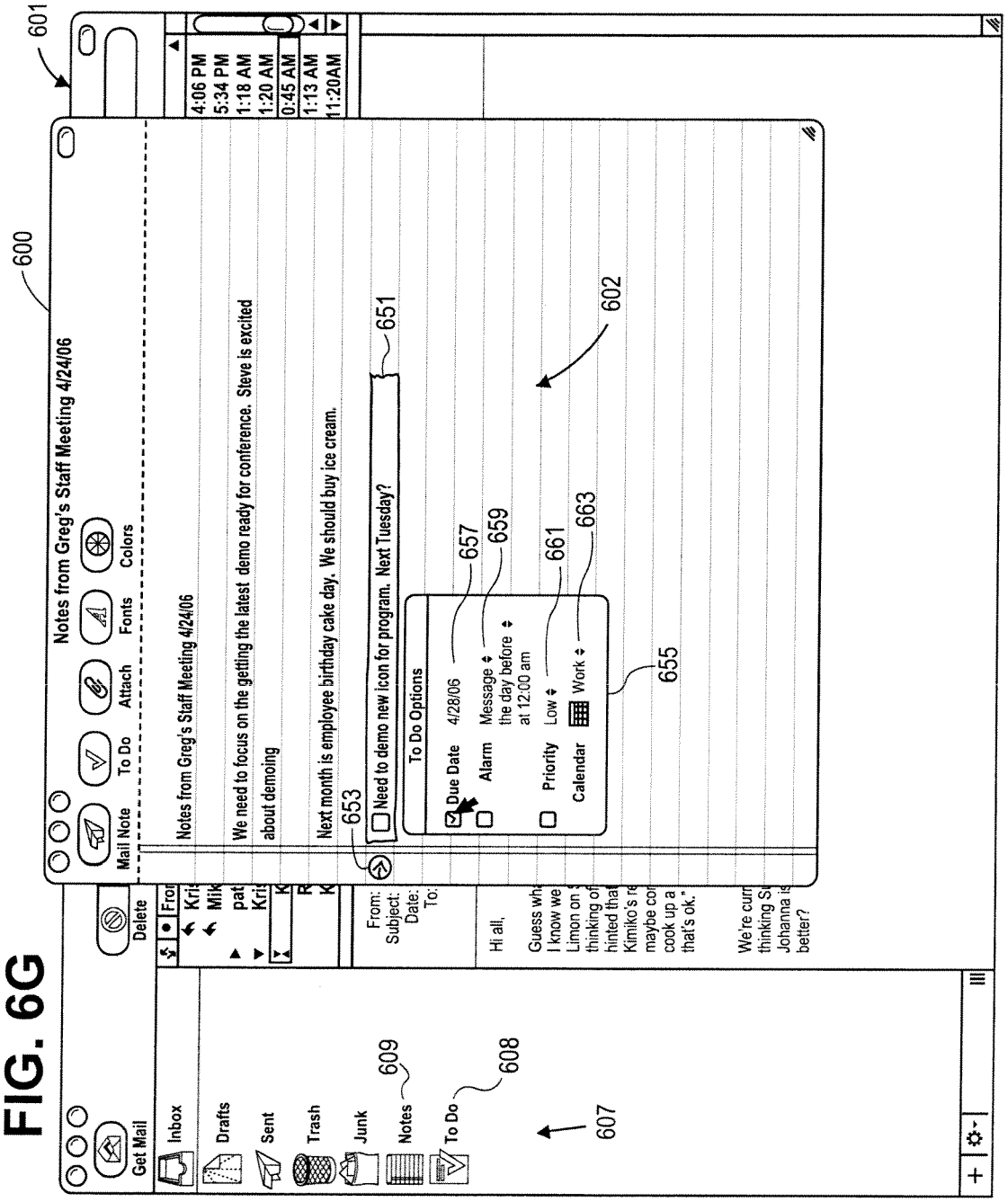

FIG. 6A shows an email window 601 and a note window 600 which overlaps the email window 601. The body 602 of the note window 600 is capable of receiving text entered by a user of the system. Further, the user can select the text or other information and create a new To do item as illustrated in the method of FIG. 5. The email window 601 includes a mailbox view area 607 and a To do collection button 608 and a notes collection button 609. The body of the email 610 is shown in the lower portion of the email window 601. The note window may have been created in response to a command from the user to create a new note as described elsewhere herein. The user may enter text, such as the entered text 615 shown in FIG. 6B, into the note window 600. Then the user may select the To do button 604 which may be used to create a new To do item. If no text has been previously selected when the To do button 604 is selected, then an empty To do item appears as the new To do 617 (with no text), and this new To do item includes a To do entry field 619 and a To do interface input control 620. FIGS. 6C and 6D show the reverse sequence in which text is first selected and then the To do button 604 is selected. The user or system may enter text into the To do entry field 619. The result of the entry of text into the To do entry field 619 is the To do item 617A shown in FIG. 6C. FIG. 6C also shows that the third paragraph in the note shown in note window 600 has been selected as indicated by the selected text 630. At this point, the user or the system may select the To do button 604 to create a new To do item from the selected text 630. The result of such a selection is shown in FIG. 6D in which a new To do item has been created as To do item 633 in response to the selection of the To do button 604. The To do item 633 includes a To do interface input control 635 which may be used to set options for the To do item 633.

The use of the To do interface input controls will be further described in connection with FIGS. 6E, 6F, and 6G. As shown in FIG. 6E, a To do item 651 includes a To do interface input control 653 which is selectable by the user to open or close a To do input panel 655 shown in both FIGS. 6F and 6G. The input panel is shown closed in FIG. 6E and open in FIGS. 6F and 6G. The To do input panel 655 includes a due date input 657, an alarm input 659, a priority input 661, and a calendar name input 663. The due date input 657 allows the user or the system to select a due date. In at least one implementation, the system may automatically select the due date according to the method shown in FIG. 9. The alarm input 659 allows the user or the system to set on or off an alarm for the To do item. The priority input 661 allows the user or the system to set a priority level for the To do item. The calendar name input 663 allows the user to select the particular calendar for the To do to be associated with. In at least one implementation, the calendar application program includes a list of selectable calendars for a particular user for views of different calendars or combinations of calendars concurrently. An example of such a calendar application program is described in published U.S. Patent Application No. 2004/0044646; for example, FIG. 3 of that published U.S. patent application shows two calendars for the same user, in this case a home calendar and a work calendar, each having events, and each of which have been selected to be shown on the same calendar view for a single user. Published U.S. Patent Application 2004/0044646 is hereby incorporated herein by reference. Hence, the calendar name input 663 allows a particular To do item to be associated with a particular one of a plurality of selectable user calendars.

The mail note button 603 shown in the note window 600 is a command which allows the user to cause the note to be converted into an email and sent to another user as an email. This will be further described below in connection with the method of FIG. 7 and in connection with the exemplary user interfaces shown in FIGS. 8A-8F.

In operation 701 of FIG. 7, the data processing system receives content of a note. This may occur as a result of a user entering the content or the user merely retrieving the previously saved note. In operation 703, the data processing system receives a selection of a command to send the note as an email or other electronic message, such as instant messaging. In operation 705, the system sends the note as an email; optionally, the email may be sent with a template of the note, such as a template which resembles a yellow paper page with horizontal lines on the page as shown in FIG. 8D in the email body 833. In operation 707, another data processing system or the same data processing system receives the email, optionally in the note template format. Then in operation 709, the receiving data processing system receives a command to add the To do items, if any, in the note to the recipient's To do items, such as a To do database. Further, the recipient's data processing system may receive a command to add a new note in the recipient's note database. In certain implementations, the addition of the note occurs automatically when the To do's are imported from a note.

Figure 8A:
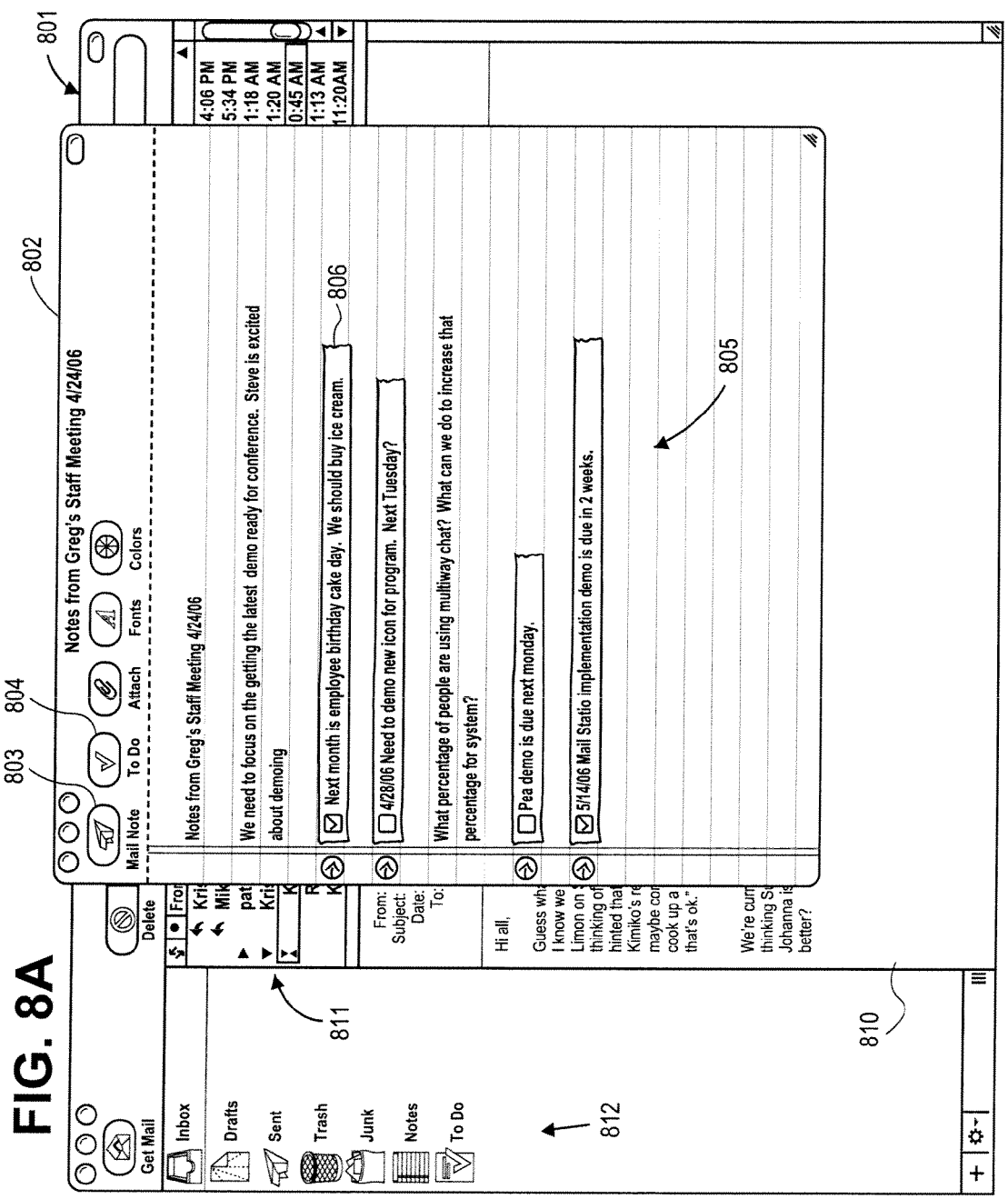
FIGS. 8A, 8B, 8C, and 8D show exemplary user interfaces which may be used to convert a note into an email and then to allow the recipient of the email to import To do's from the received email as well as to convert the received email into a note as shown in FIGS. 8E and 8F.
Figure 8B:
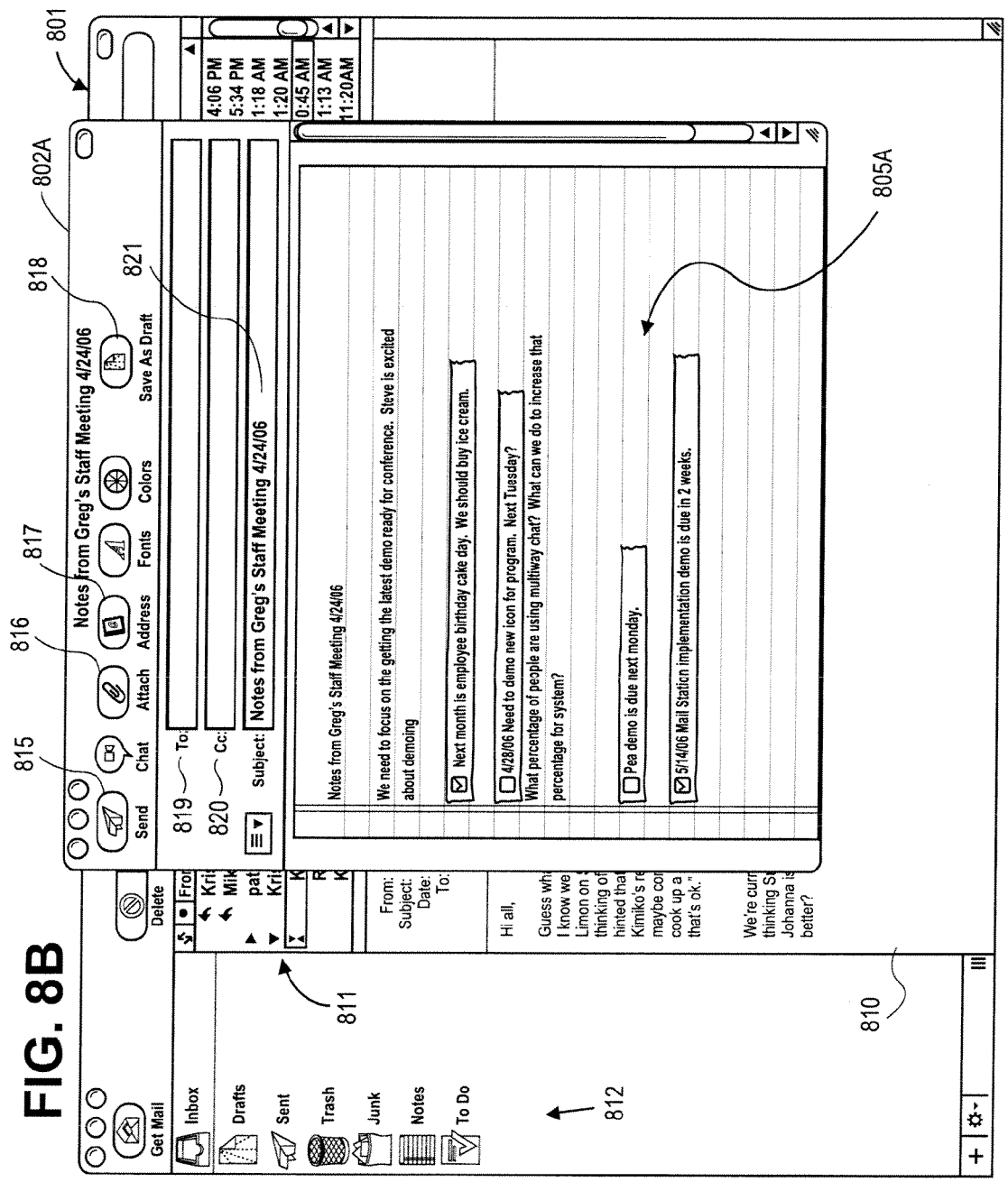
Figure 8C:
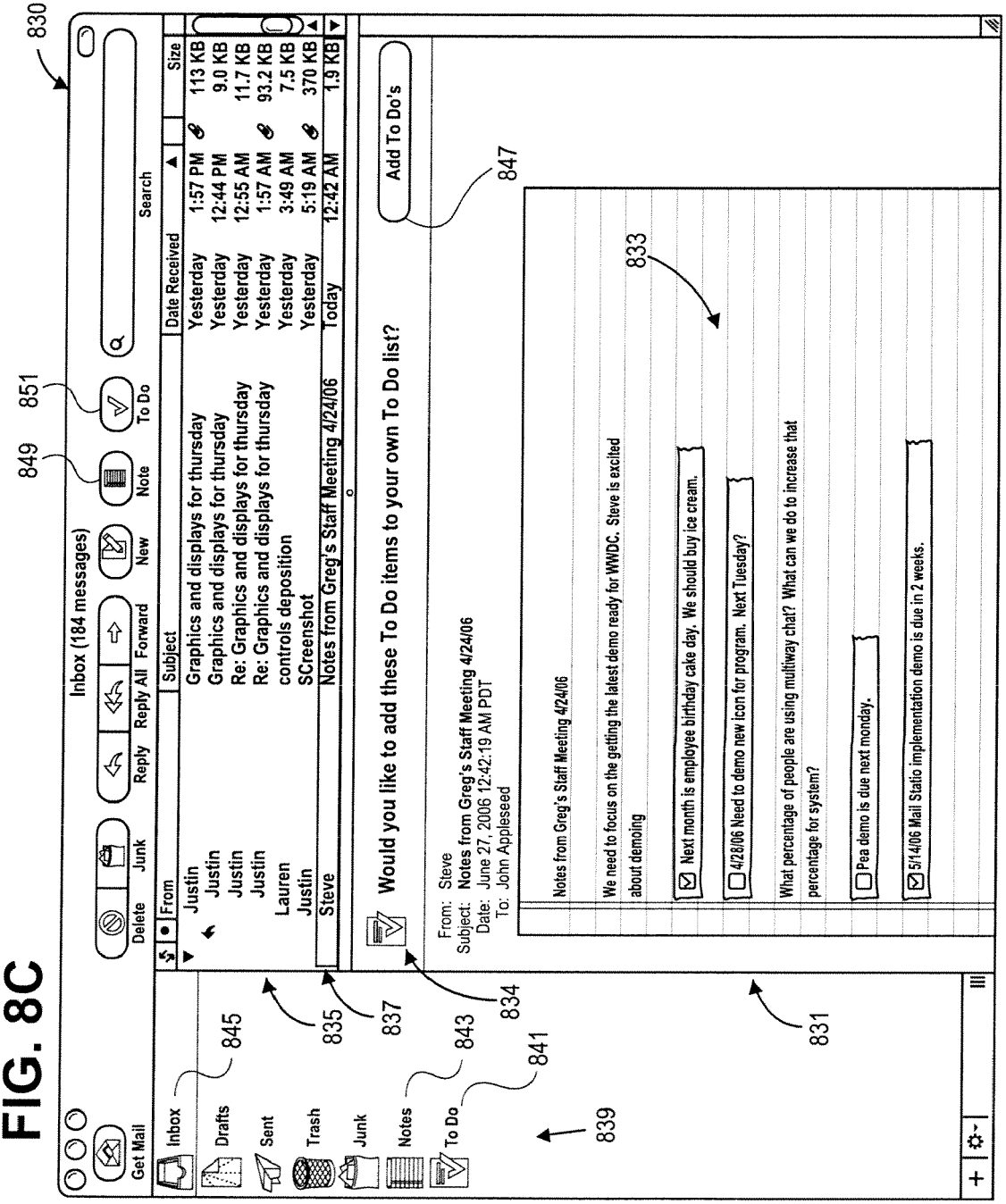

FIG. 8A shows an example of a note window 802 which includes a note body 805 having content entered into it. In addition, the note body 805 includes four To do items, including To do item 806. The note window 802 includes at least two user interface controls which are the mail note button 803 and the To do button 804. The To do button 804 is used by the user to create a To do, either before entering any text or after selecting text. The mail note button 803 may be used by a user to cause the note to be converted into an email and to send the email as further described herein. The email window 801 includes a body 810 of the email and also a mailbox view area 812 and a view 811 of received emails in the currently selected inbox as shown in FIG. 8A. If the mail note button 803 is selected or activated, this results in the creation of a new email shown in window 802A which represents the email of the note shown in FIG. 8A. In the interface shown in FIG. 8B, the email 802A has not yet been sent but can be sent by activation or selection of the send button 815. In addition, the user may attach an attachment to this email using the attach button 816. The email window 802A includes a "To" field 819, a "cc" field 820, and a "Subject" field 821. The email window also includes an address book button 817 to cause the appearance of an address book containing email addresses and other information, and a "save as draft" button 818 which allows the user to save the note as a draft. The note has been converted into an email but, in at least certain embodiments, it will remain as a separate note document within the note database 203 described above. The email itself will also be separately stored in an email database and the To do items within the note will be separately stored in the To do database 204 as described above. Further, as described herein, the To do items in the To do database are synchronized in a live manner with the corresponding To do items within any note containing those To do items. After the user has, or the system has, entered an email address or other address in the "To" field 819, the email may be sent by activating the "Send" button 815, which causes the email to be sent to the recipient or recipients. FIG. 8C shows an exemplary user interface of an email window 830 having received an email sent from the interface shown in FIG. 8B. The email window 830 includes an email pane 831 and a view 835 of received emails. The email body 833 is displayed within the email pane 831. The email body represents the content of the email 837 shown in the view 835 of the inbox 845. The inbox 845 is shown in the mailbox view area 839 which also includes the To do collection button 841 and the notes collection button 843. It can be seen that the template of the note which was sent was preserved within the email received by the recipient. In one exemplary embodiment, the note may appear to be a yellow piece of paper with horizontal lines having text written in registration with those horizontal lines as shown in FIG. 8C. Other types of templates for notes may be alternatively used.

The recipient's data processing system can recognize that the notes contain To do items and, as a result, display the To do pane 834 which asks the user whether or not to add the To do items in the note which was received through the email to the user's own To do list. This can be achieved by the user or the system selecting the "add To do's" button 847 shown in the To do pane 834. The selection of the "add To do's" button 847 will cause the To do's from the email received in the note template in this embodiment to be added to the recipient's To do database, which may be a system wide To do database which is similar to the database 204 shown in FIG. 2. In fact, in certain embodiments, the recipient may have the similar software architecture shown in FIG. 2 in which two separate application programs, an email application program and a calendar application program, can separately access a To do database 204 having To do items synchronized with corresponding To do items in one or more notes in the note database 203. Further, other application programs on the recipient's data processing system may also be able to access the To do database and the corresponding To do items in those To do entries in the To do database 204. An exemplary user interface of the email window 830 after selection of the "add To do's" button 847 is shown in FIG. 8D, in which the four To do items from the body 833 have been displayed in the To do pane 861. In addition, the selection of the button 847 may also cause the creation of a new note containing those four To do items so that the note remains in the note database even if the email 837 is deleted. As noted elsewhere herein, the note containing these four To do items may be synchronized with the To do items themselves and maintained in a note database which references the corresponding To do items maintained in the To do database. Each To do item, such as To do item 863, includes a To do interface input control, such as To do interface input control 865 and a "done" check box input 871.

Figure 8F:
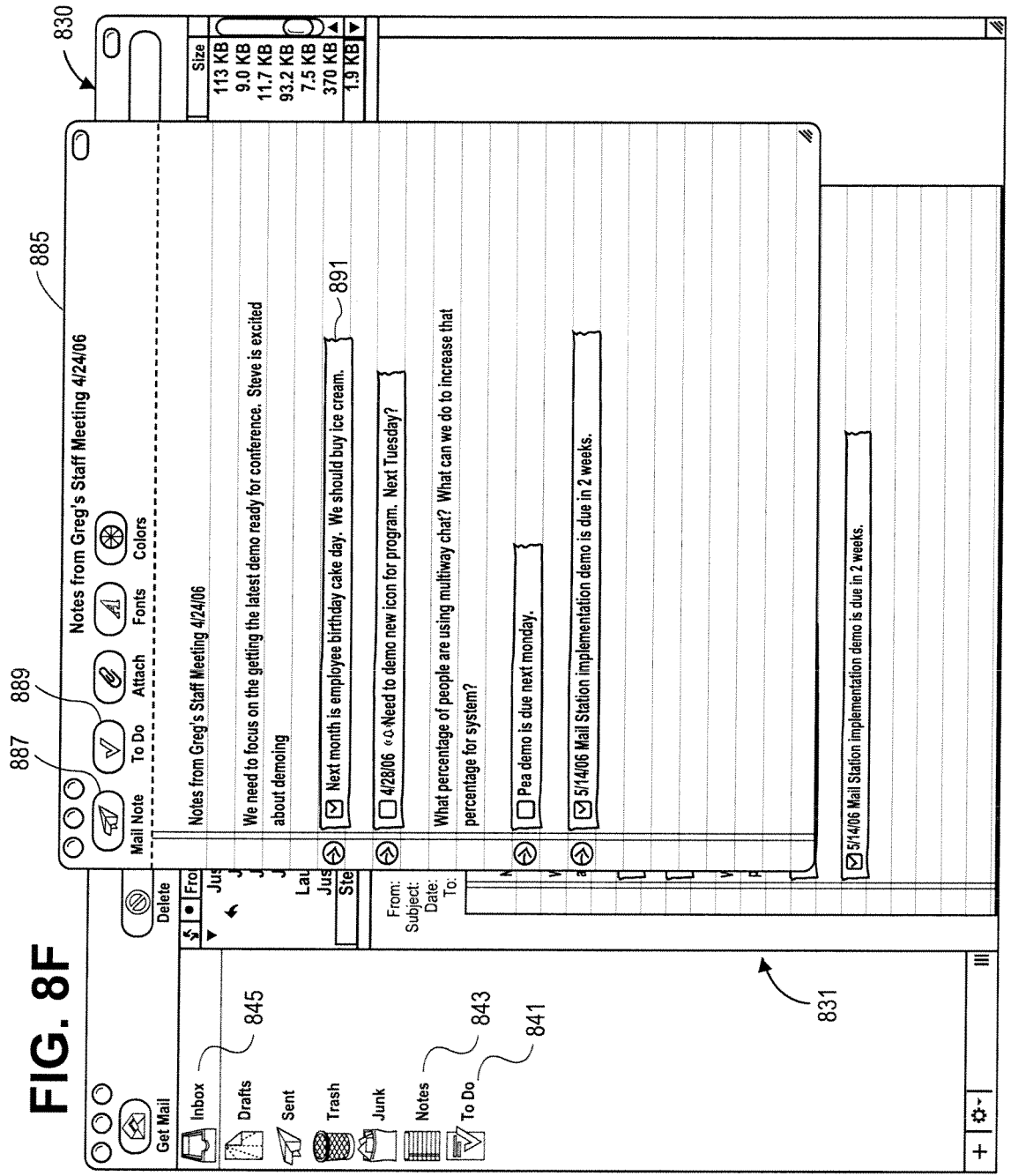

FIGS. 8E and 8F show an alternative embodiment in which a received email, in a note template format, can be turned into a note in response to a user selection on the recipient's data processing system. If the note contains To do items, those To do items are automatically, in at least certain embodiments, added as new To do items in the To do database, while the note, if imported, is added as a note in the note database, such as the note database shown in FIG. 2. In this embodiment, a note pane 875 asks the user whether the user would like to add the note from the email. If the user selects the "Create Note" button 877, then a new note is created as shown in FIG. 8F as note 885, which includes To do's from the note received as an email as shown in FIG. 8E. For example, the To do item 891 is shown in the note window 885 which includes the To do button 889 and a mail note button 887 which is similar to the corresponding buttons shown for note window 600 herein.

Figure 9:
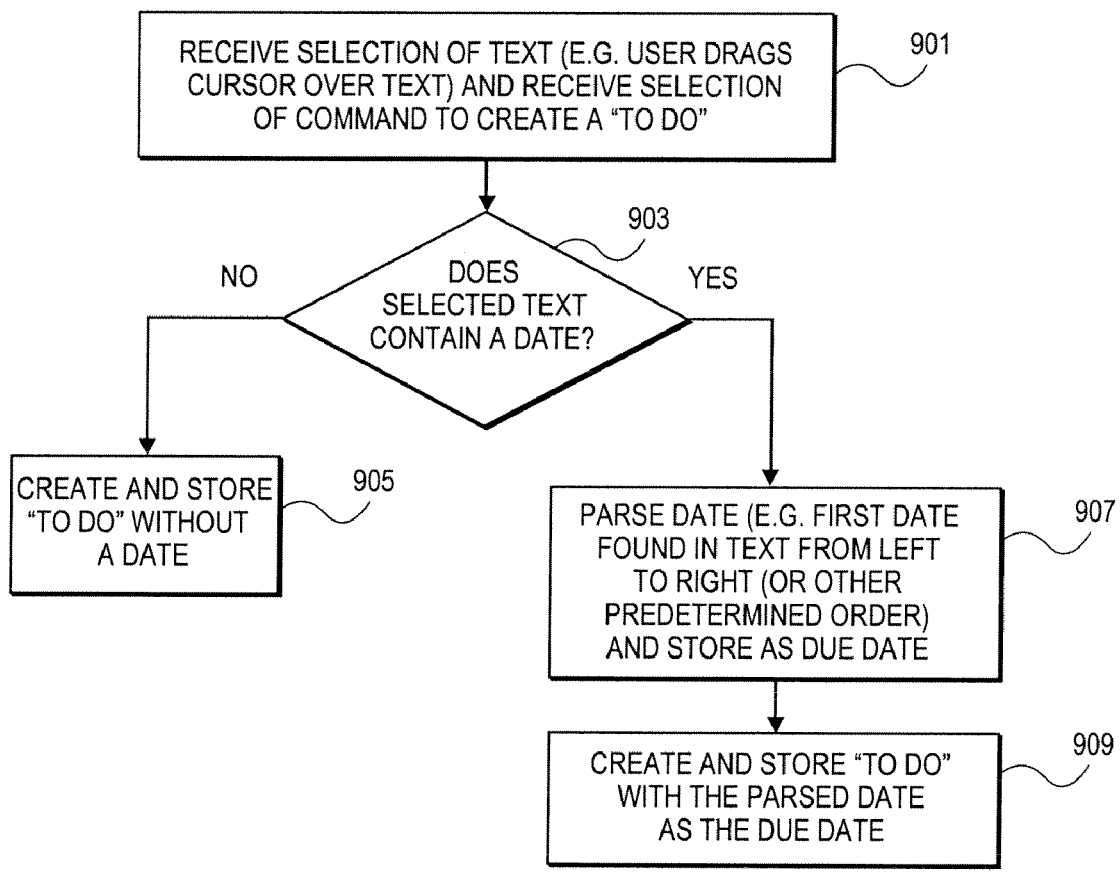
FIG. 9 shows a flowchart illustrating an exemplary method according to certain aspects of the present inventions.

As noted herein, the system may automatically determine a due date in the process of creating a To do. An example of this method is shown in FIG. 9. In operation 901, the data processing system receives a selection of text. For example, the user may drag a cursor across the desired text. The system may then receive a selection of a command to create a To do item. Alternatively, the sequence of operations may be reversed as noted above. In operation 903, the data processing system automatically determines whether the selected text contains a date. In certain implementations, the system may prompt the user with a dialog box containing a question asking the user to confirm that the date detected within the text is in fact the desired due date. In other embodiments, the system may select merely the first date and use that as a due date. If there is no date within the text, then the system diverts to operation 905 in which the To do item is created and stored without a due date. On the other hand, if the system determines that the selected text contains a date, then the system proceed to operation 907 in which the date is parsed from the selected text and stored as the due date. The system may select the first date found in text going in a predetermined order (e.g. from left to right) or the system may prompt the user to pick from one of multiple dates contained within the selected text or to abort the operation of attempting to determine a due date. After parsing the proper date, either with or without user input in operation 907, the data processing system creates and stores, in operation 909, a new To do item with the parsed date (with or without user input) as the due date for the new To do item.

Figure 10:
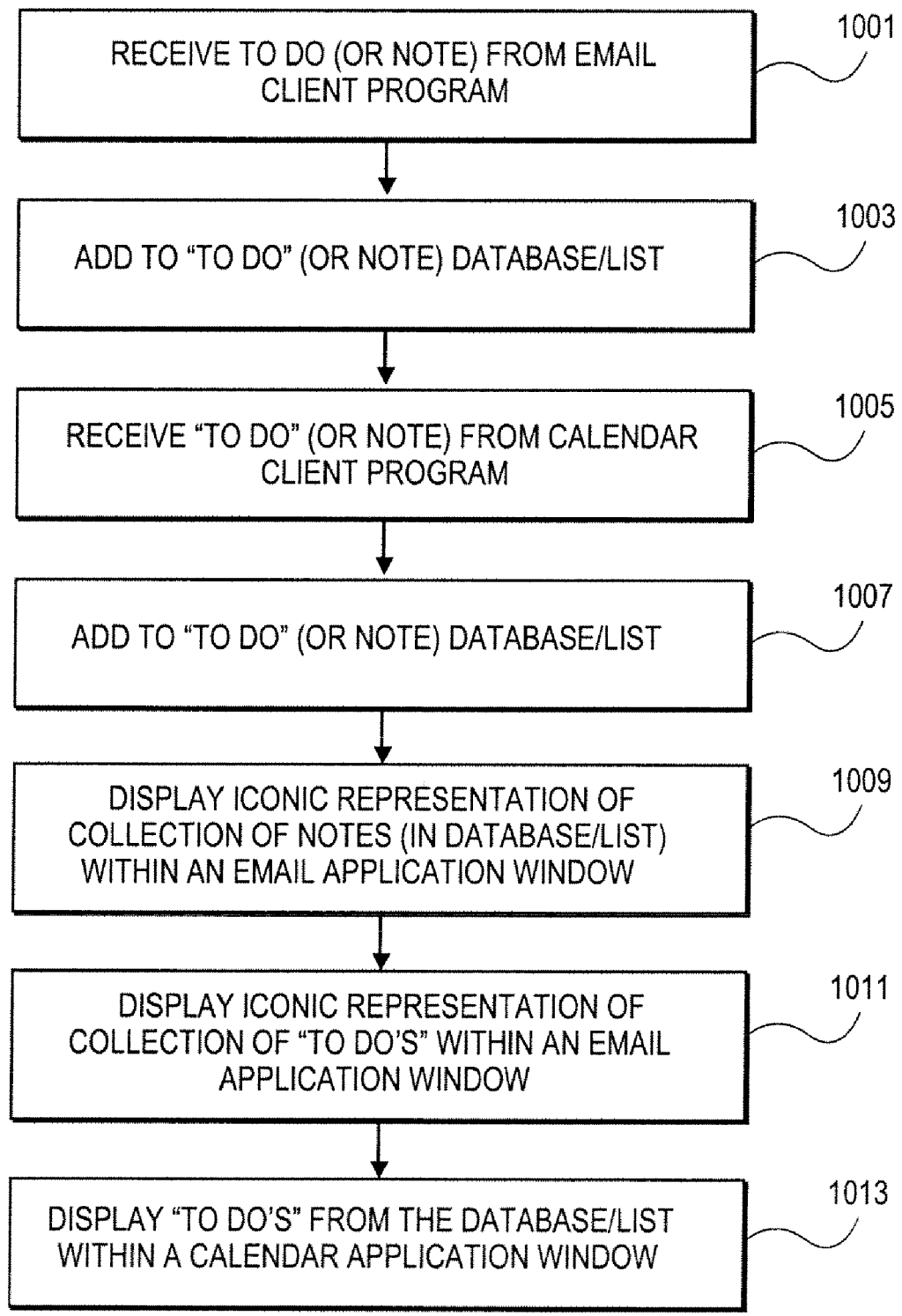
FIG. 10 is a flowchart illustrating an exemplary method according to certain aspects of the present inventions.

FIG. 10 shows an exemplary method of maintaining multiple databases such as those shown in FIG. 2. It will be appreciated that this is one example of a sequence of events and that other sequences in a different order with different elements are also possible. The databases referred to in FIG. 10 may be the same as the note database and the To do database shown in FIG. 2 or may be different databases. The method shown in FIG. 10 begins in operation 1001 in which the data processing system receives a To do item or a note item from an email client program. This item is, in operation 1003, added to the To do database or the note database depending on the type of item it was. If it was a note containing a To do item, then both the note gets added to a note database and the To do item gets added to a To do database as described above. Further, in at least certain embodiments, the To do items within the note are synchronized with the To do items in the To do database. In operation 1005, the data processing system receives a To do item from a calendar application program, such as the calendar application program 202 shown in FIG. 2. In response, in operation 1007, the data processing system adds this To do item to the To do database. The data processing system may, in operation 1009, display an iconic representation of a collection of notes, such as notes in the note database, within an email application window. An example of such an iconic representation is shown as the note collection button 409 shown in FIG. 4E. In operation 1011, the data processing system may display an iconic representation of a collection of To do items within an email application program, such as the To do collection button 408 shown in FIG. 4E. In operation 1013, the data processing system may display To do items from the To do database within a calendar application window.

Figure 11:
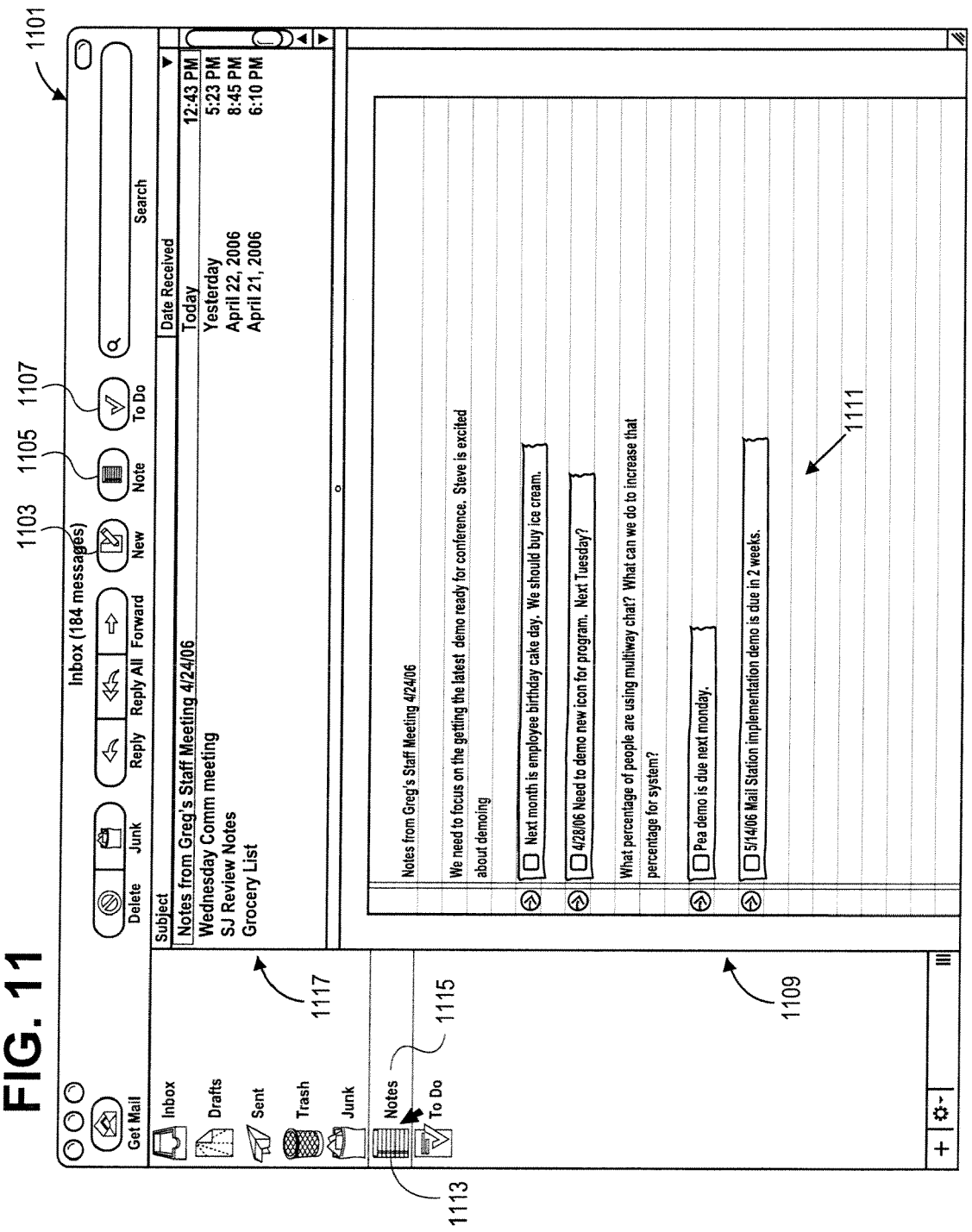
FIG. 11 shows an exemplary user interface for displaying notes within a note database to a user of a data processing system.

FIG. 11 shows a view of notes in a note view. The note pane 1109 includes the content 1111 of a note selected from the list shown in the view pane 1117. This view within notes window 1111 is obtained by selecting the notes collection button 1113 as indicated by the highlighting 1115. Each of the different notes may be viewed by selecting the appropriate note within the pane 1117.

Figure 12:
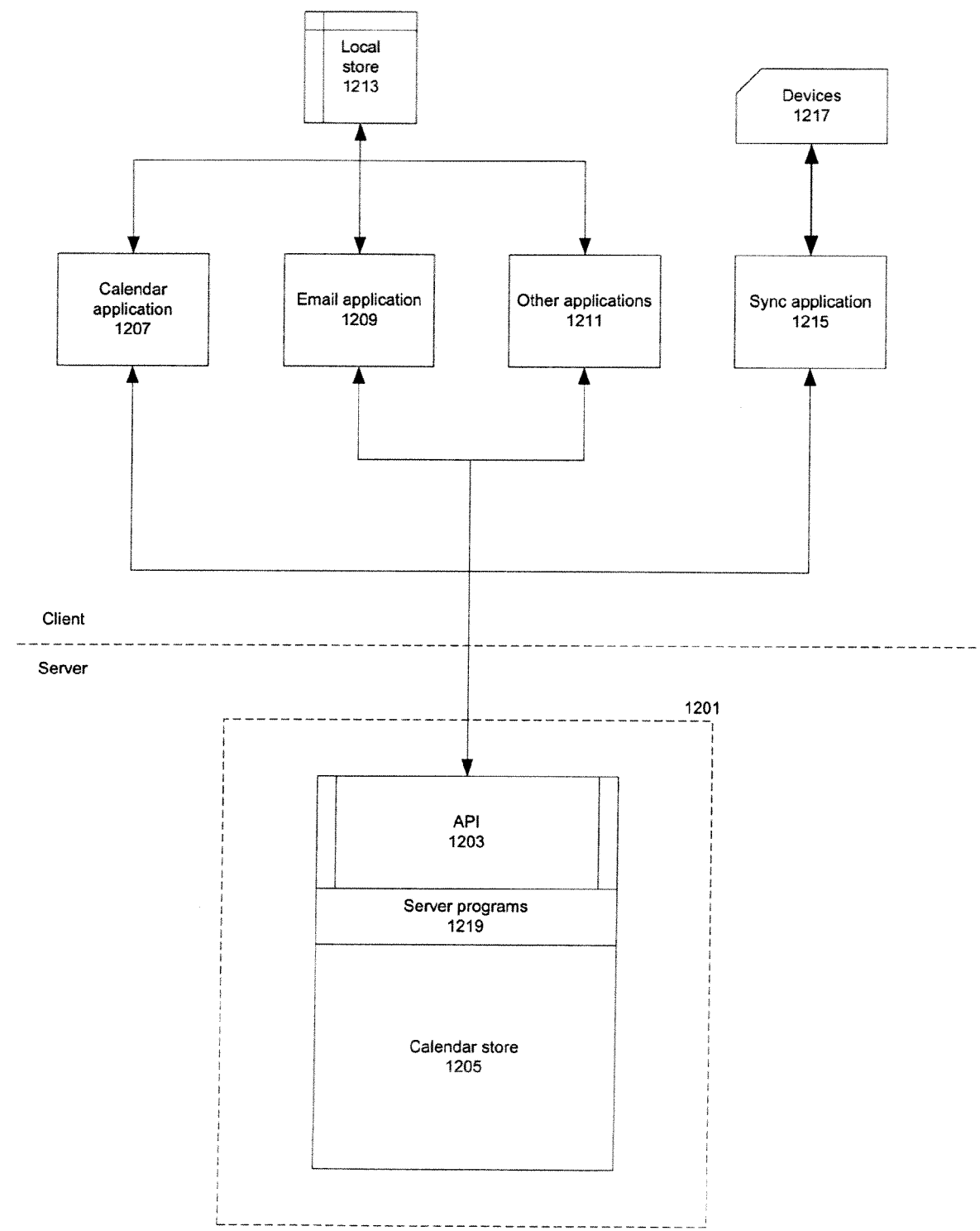
FIG. 12 shows an alternate embodiment of the software architecture of FIG. 2 in which the To do database is integrated into a calendar store that is accessed using functions provided by an application program interface (API).

FIG. 12 shows an alternate embodiment of the software architecture of FIG. 2. In this embodiment, a framework 1201 includes a calendar store 1205 and an application program interface (API) 1203. The calendar store 1205 may include calendar events and to do's (otherwise referred to herein as tasks), and optionally other data items, such as notes as described above. The API 1203 provides an interface to the calendar store 1205 for client application programs and performs the functions previously described above on behalf of the application programs. In one embodiment, the API 1203 provides additional functions described further below. Exemplary application programs that may use the framework 1201 includes calendar application 1207, e-mail application 1209 and a sync application 1215. Various other applications 1211 are also contemplated as using the API 1203. The calendar application 1207, e-mail application 1209, and other applications 1211 are illustrated as accessing calendar data on a local store 1213, such as a hard drive on a computer that is executing the applications. These applications call the API 1203 to retrieve data from the calendar store 1205, or to send data from the local store 1213 to the calendar store 1205 for storage. The sync application 1215 synchronizes devices 1217 with data on the calendar store 1205 through the API 1203. The calendar store 1205 may be hosted on one or more servers and the data within calendar store 1205 may be managed by appropriate server program(s). In one embodiment, a calendar server program, such as a iCal server, manages calendar data, such as events and calendar tasks, within the calendar store 1205, and an IMAP server program manages tasks related to e-mails. The server programs 1219 may be considered part of the framework 1201. Although the API 1203 is illustrated as being part of the server layer of the architecture of FIG. 12, one of skill will immediately recognize that portions of the API 1203 may be part of the client layer, and that all or part of the API 1203 may be positioned in a middleware layer.

In one embodiment, the API 1203 provides three additional functions to the client applications. One function returns one or more occurrences of a series of reoccurring calendar data to an application. A second function propagates calendar data between the local store 1213 and the calendar store 1205, and between the devices 1217 and the calendar store 1205 to provide transparency between the application and the calendar store 1205. A third function provides notification of changes or new data in the calendar store 1205 to interested applications.

Figure 13:
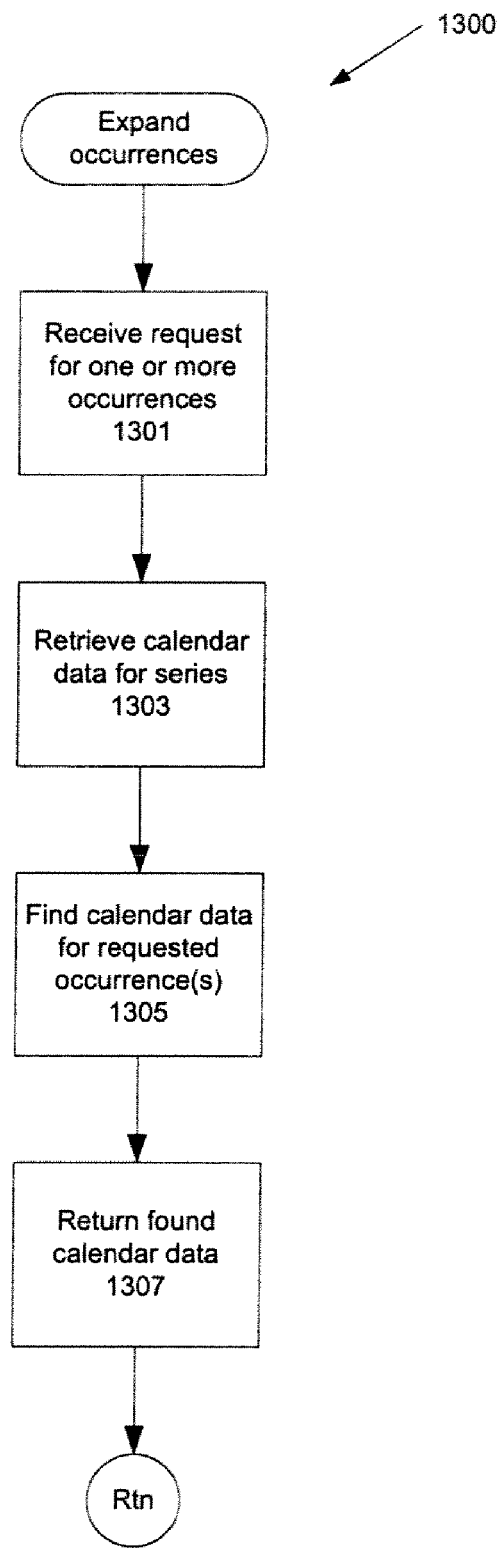
FIG. 13 is a flowchart illustrating an exemplary method for an API that expands reoccurring events.

FIG. 13 illustrates one embodiment of an expand occurrences method 1300 that is executed as part of the API 1203. The method 1300 is invoked by the API 1203 when an application requests calendar data for one or more occurrences of a series of reoccurrences, such as a set of reoccurring events. The method 1300 receives a request from a client application that specifies criteria identifying the series and the desired occurrences (block 1301). The method 1300 retrieves the calendar data for the identified series of occurrences from the calendar store 1205 (block 1303) and finds the calendar data for the requested occurrences (block 1305). The found calendar data is returned to the client application (block 1307). Input to the method 1300 may be a range of dates that define the occurrences, a specific occurrence date, or similar search criteria. Although not illustrated, it will be appreciated that the method 1300 interfaces with the appropriate server program to retrieve the calendar data from the calendar store 1205.

Figure 14:
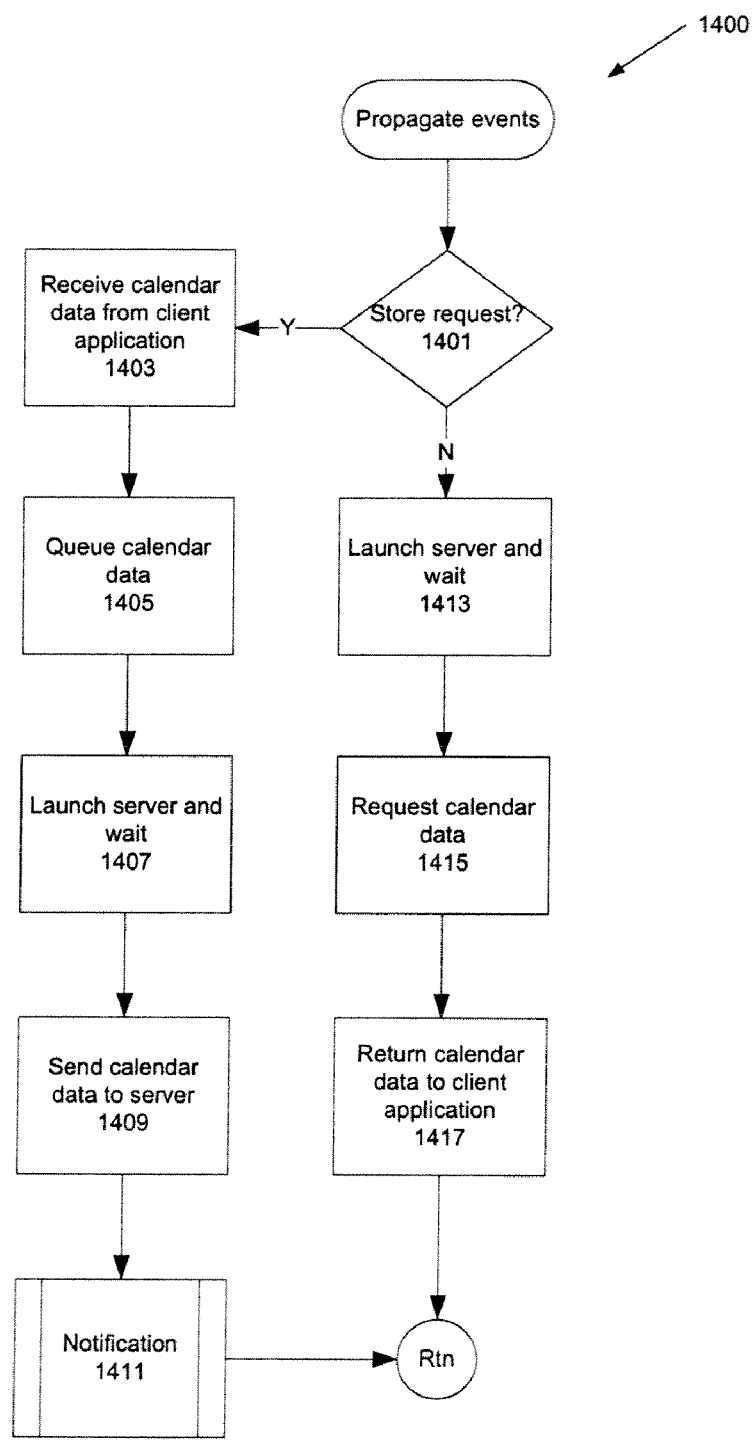
FIG. 14 is a flowchart illustrating an exemplary method for an API that propagates data to/from the calendar store.

FIG. 14 illustrates one embodiment of a propagate events method 1400 that is executed as part of the API 1203. The propagate events method is invoked by the API 1203 when an application requests data be stored in the calendar store 1205, or when an application requests data be retrieved from the calendar store 1205. If the request is a store request (block 1401), the method 1400 receives the calendar data from a client application at block 1403. The calendar data is queued at block 1405, and the method 1400 launches the appropriate server program and waits (block 1407). When the appropriate server program is active, the method 1400 sends the calendar data to the server program at block 1409. At block 1411, the method 1400 performs a notification method as described below in conjunction with FIG. 15 to notify interested application of the change to the calendar data. Thus, if the calendar application 1207 modifies an event, the sync application 1215, the email application 1209, and the other applications 1211 will be notified of the change. Returning now to block 1401, if the request is to retrieve calendar data, the method 1400 launches the appropriate server program and waits (block 1413). When the server program is active, the method 1400 requests the calendar data from the server program at block 1415, and returns the calendar data to the requesting client application at block 1407. It will be appreciated that the method 1400 does not have to launch a server program if the appropriate one is already active.

Figure 15:
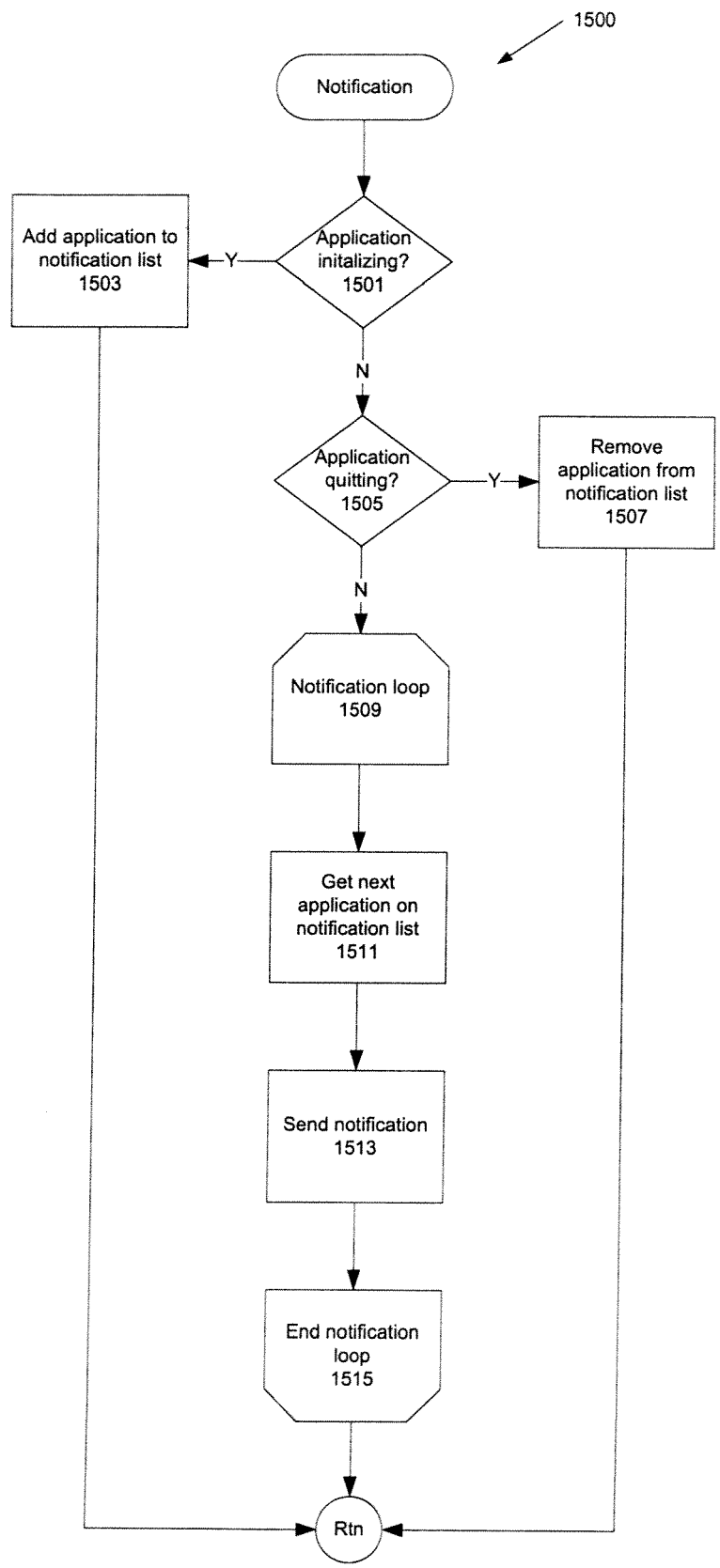
FIG. 15 is a flowchart illustrating an exemplary method for an API that provides notification of changes in the calendar store.

FIG. 15 illustrates one embodiment of a notification method 1500 that is executed as part of the API 1203. The notification method 1500 manages a list of a applications that want to be notified of changes in the calendar store 1205. When a client application launches or quits, the API 1203 invokes the notification method 1500. The notification method 1500 is also invoked when changes have been made to the calendar store 1205, such as described above. If an application is initializing (block 1501), the application is added to the notification list at block 1503. If an application is stopping (block 1505), the application is removed from the notification list at block 1507. When a change is made to the calendar store 1205, the notification method 1500 performs a notification loop (block 1509 through block 1515). The method 1300 gets the next application on the notification list (block 1511) and sends a notification to that application (block 1513). The notification loop ends at block 1515 when all applications on the list have been notified. In an alternate embodiment not shown, the applications register their interest in specific types of calendar data. Accordingly, the notification method tracks the type of data being changed and notifies only the active applications that have registered an interest in that particular type of data. It will be appreciated that the tracking function could be performed by an embodiment of the propagate events method 1400, which would include the data type when it invoked the notification method.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable storage medium containing executable program instructions that cause a data processing system to perform operations comprising:

invoking a programming interface to add an email application to a list of one or more applications for notifications when the email application launches;

in response to receiving a selection of a command, creating a to do item in a to do database, the to do item including at least a portion of text selected from an email message of the email application;

storing a note item in a note database, the note item associated with the email message, the note item synchronized with the to do item;

transmitting data to allow presentation of the to do item in a separate portion of an email window including the portion of text selected from the email message, wherein the presentation includes configuring a note view as a screen region in the separate portion of the email window, the note view displaying the note item concurrently with the email message, the note view to allow annotation of the email message via the note item, the note view including a plurality of to do items including the to do item associated with the email message, the note view to enable text input to describe the to do item, and the note view to enable an input indicating whether the to do item is completed or not;

in response to receiving a request to store a calendar data from a separate program via the programming interface, sending the calendar data to a server program to be stored in a calendar store capable of synchronizing with the note database and the to do database, the request indicating a modification of the calendar data; and notifying the applications in the list of applications, including the email application, of the modification of the calendar data via the programming interface, the notification to enable the synchronization between the calendar store with the to do database, wherein the email window of the email application includes an iconic representation to allow display of to do items from the to do database, and wherein the programming interface is capable of receiving a request from an application to retrieve an occurrence from a series of reoccurring calendar data, finding the occurrence in accordance with criteria specified by the application by sending a query to the server program that manages the calendar store, and returning the occurrence to the application.

2. The machine readable storage medium of claim 1, wherein finding further comprises:

expanding the series of reoccurring calendar data retrieved by the server program.

3. The machine readable storage medium of claim 1 further comprising:

queuing the query if the server program is not active.

4. The machine readable storage medium of claim 3 further comprising:

launching the server program if a query is queued.

5. The machine readable storage medium of claim 1 further comprising:

adding the application to a notification list when the application is initialized;

removing the application from the notification list when the application quits; and sending a notification to each application on the notification list when the calendar store changes.

6. A machine readable storage medium containing executable program instructions that cause a data processing system to perform operations comprising:

invoking a programming interface to add an email application to a list of one or more applications for notifications when the email application launches;

in response to receiving a selection of a command, creating a to do item in a to do database, the to do item including at least a portion of text selected from an email message of the email application;

storing a note item in a note database, the note item associated with the email message, the note item synchronized with the to do item; and transmitting data to allow presentation of the to do item in a separate portion of an email window including the portion of text selected from the email message, wherein the presentation includes configuring a note view as a screen region in the separate portion of the email window, the note view displaying the note item concurrently with the email message, the note view to allow annotation of the email message via the note item, the note view including a plurality of to do items including the to do item associated with the email message, the note view to enable text input to describe the to do item, and the note view to enable an input indicating whether the to do item is completed or not;

in response to receiving a request to store a calendar data from a separate application via the programming interface, sending the calendar data to a server program to be stored in a calendar store capable of synchronizing with the note database and the to do database, the request indicating a modification the calendar data; and notifying the applications in the list of applications, including the email application, of the modification of the calendar data via the programming interface, the notification to enable the synchronization between the calendar store with the to do database, wherein the email window of the email application includes an iconic representation to allow display of to do items from the to do database, and wherein the programming interface is capable of receiving a request from an application, if the request is a retrieve request, sending a query to the server program, and returning retrieved calendar data to the application.

7. The machine readable storage medium of claim 6 further comprising:

queuing the query if the server program is not active.

8. The machine readable storage medium of claim 7 further comprising:

launching the server program if a query is queued.

9. The machine readable storage medium of claim 6 further comprising:

adding the application to a notification list when the application is initialized; and removing the application from the notification list when the application quits.

10. A method of execution by a computer, the method comprising:

invoking a programming interface to add an email application to a list of one or more applications for notifications when the email application launches;

in response to receiving a selection of a command, creating a to do item in a to do database, the to do item including at least a portion of text selected from an email message of the email application;

storing a note item in a note database, the note item associated with the email message, the note item synchronized with the to do item;

transmitting data to allow presentation of the to do item in a separate portion of an email window including the portion of text selected from the email message, wherein the presentation includes configuring a note view as a screen region in the separate portion of the email window, the note view displaying the note item concurrently with the email message, the note view to allow annotation of the email message via the note item, the note view including a plurality of to do items including the to do item associated with the email message, the note view to enable text input to describe the to do item, and the note view to enable an input indicating whether the to do item is completed or not;

in response to receiving a request to store a calendar data from a separate program via the programming interface, sending the calendar data to a server program to be stored in a calendar store capable of synchronizing with the note database and the to do database, the request indicating a modification of the calendar data; and notifying the applications in the list of applications, including the email application, of the modification of the calendar data via the programming interface, the notification to enable the synchronization between the calendar store with the to do database, wherein the email window of the email application includes an iconic representation to allow display of to do items from the to do database, and wherein the programming interface is capable of
  receiving a request from an application to retrieve an occurrence from a series of reoccurring calendar data, finding the occurrence in accordance with criteria specified by the application by sending a query to the server program that manages the calendar store, and returning the occurrence to the application.

11. The method of claim 10, wherein finding further comprises:
  expanding the series of reoccurring calendar data retrieved by the server program.

12. The method of claim 10 further comprising:
  queuing the query if the server program is not active.

13. The method of claim 12 further comprising:
  launching the server program if a query is queued.

14. The method of claim 10 further comprising:
  adding the application to a notification list when the application is initialized;
  removing the application from the notification list when the application quits; and
  sending a notification to each application on the notification list when the calendar store changes.

15. A method of execution by a computer, the method comprising:
  invoking a programming interface to add an email application to a list of one or more applications for notifications when the email application launches;
  in response to receiving a selection of a command, creating a to do item in a to do database, the to do item including at least a portion of text selected from an email message of an email application;
  storing a note item in a note database, the note item associated with the email message, the note item synchronized with the to do item;
  transmitting data to allow presentation of the to do item in a separate portion of an email window including the portion of text selected from the email message, wherein the presentation includes configuring a note view as a screen region in the separate portion of the email window, the note view displaying the note item concurrently with the email message, the note view to allow annotation of the email message via the note item, the note view including a plurality of to do items including the to do item associated with the email message, the note view to enable text input to describe the to do item, and the note view to enable an input indicating whether the to do item is completed or not;
  in response to receiving a request to store a calendar data from a separate application via the programming interface, sending the calendar data to a server program to be stored in a calendar store capable of synchronizing with the note database and the to do database, the request indicating a modification the calendar data; and
  notifying the applications in the list of applications, including the email application, of the modification of the calendar data via the programming interface, the notification to enable the synchronization between the calendar store with the to do database, wherein the email window of the email application includes an iconic representation to allow display of to do items from the to do database, and wherein the programming interface is capable of
    receiving a request from an application,
    if the request is a retrieve request,
      sending a query to the server program, and
      returning retrieved calendar data to the application.

16. The method of claim 15 further comprising:
queuing the query if the server program is not active.

17. The method of claim 16 further comprising:
launching the server program if a query is queued.

18. The method of claim 15 further comprising:
  adding the application to a notification list when the application is initialized; and
  removing the application from the notification list when the application quits.

19. A system comprising:
  means for invoking a programming interface to add an email application to a list of one or more applications for notifications when the email application launches;
  means for creating, in response to receiving a command, a to do item in a to do database, the to do item including at least a portion of text selected from an email message of the email application;
  means for storing a note item in a note database, the note item associated with the email message, the note item synchronized with the to do item;
  means for transmitting data to allow presentation of the to do item in a separate portion of an email window including the portion of text selected from the email message, wherein the presentation includes configuring a note view as a screen region in the separate portion of the email window, the note view displaying the note item concurrently with the email message, the note view to allow annotation of the email message via the note item, the note view including a plurality of to do items including the to do item associated with the email message, the note view to enable text input to describe the to do item, and the note view to enable an input indicating whether the to do item is completed or not;
  in response to receiving a request to store a calendar data from a separate program via the programming interface, means for sending the calendar data to a server program to be stored in a calendar store capable of synchronizing with the note database and the to do database, the request indicating a modification of the calendar data; and
  means for notifying the applications in the list of applications, including the email application, of the modification of the calendar data via the programming interface, the notification to enable the synchronization between the calendar store with the to do database, wherein the email window of the email application includes an iconic representation to allow display of to do items from the to do database, wherein the programming interface is capable of
  managing the calendar store and
  interacting between the calendar store and an application to send a query,
    to retrieve calendar data to find an occurrence from a series of reoccurring calendar data requested by the application,
    to send calendar data provided by the application to store the calendar data in the calendar store, and
    to maintain a notification list of applications to be notified when the calendar store changes.

20. The system of claim 19, wherein the interaction queues the query if the management of the calendar store is not active, and launches the management.

* * * * *